United States Patent [19]

Benslay

[11] Patent Number: 4,477,335

[45] Date of Patent: Oct. 16, 1984

[54] SEPARATION OF REGENERATED CATALYST FROM COMBUSTION PRODUCTS

[75] Inventor: Roger M. Benslay, Catlettsburg, Ky.

[73] Assignee: Ashland Oil, Inc., Ashland, Ky.

[21] Appl. No.: 378,578

[22] Filed: May 17, 1982

[51] Int. Cl.³ .................. C10G 11/00; B01J 37/14; F27B 15/08

[52] U.S. Cl. .................. 208/113; 208/161; 208/164; 502/41; 502/43; 422/147

[58] Field of Search .......... 208/113, 161, 164; 422/144, 147, 223; 252/417; 502/43, 41

[56] References Cited

U.S. PATENT DOCUMENTS

| | | | |
|---|---|---|---|
| 2,492,948 | 1/1950 | Berger | 502/44 |
| 3,006,693 | 10/1961 | Claunch, Jr. et al. | 422/219 |
| 3,033,906 | 5/1962 | Hay et al. | 502/43 |
| 3,074,878 | 1/1963 | Pappas | 208/127 |
| 3,661,799 | 5/1972 | Cartmell | 502/43 |
| 3,835,029 | 9/1974 | Larson | 208/113 |
| 4,066,533 | 1/1978 | Myers et al. | 208/153 |
| 4,070,159 | 1/1978 | Myers et al. | 208/161 |
| 4,219,407 | 8/1980 | Haddad et al. | 208/153 |
| 4,311,579 | 1/1982 | Bartholic | 208/73 |
| 4,318,800 | 3/1982 | Woebcke | 208/127 |
| 4,325,833 | 4/1982 | Scott | 252/417 |
| 4,331,533 | 5/1982 | Dean et al. | 208/113 |
| 4,332,674 | 6/1982 | Dean et al. | 208/120 |
| 4,336,160 | 6/1982 | Dean et al. | 502/42 |
| 4,341,624 | 7/1982 | Myers | 208/120 |

Primary Examiner—Delbert E. Gantz
Assistant Examiner—O. Chaudhuri
Attorney, Agent, or Firm—Richard C. Willson, Jr.; Carl D. Farnsworth

[57] ABSTRACT

A method and apparatus for separating regenerated catalyst from gaseous combustion products within a regenerator. The apparatus comprises a downcomer within the regenerator vessel through which the catalyst and gaseous combustion products flow. Means are provided at the lower end of the downcomer for utilizing the momentum of the catalyst particles to separate them from the gaseous combustion products.

10 Claims, 3 Drawing Figures

SEPARATION OF REGENERATED CATALYST FROM COMBUSTION PRODUCTS

CROSS-REFERENCE TO RELATED APPLICATIONS

The following patents and patent applications relate to the same general field as that of the present invention, and these patents and patent applications are each hereby incorporated by reference.

U.S. patent application Ser. No. 254,367, filed Apr. 15, 1981 which is a continuing application of Ser. No. 99,050, filed Nov. 30, 1979, which in turn, is a continuing application of Ser. No. 969,601, filed Dec. 14, 1978 in the names of George D. Myers and Lloyd E. Busch for "Method for Cracking Residual Oils," all abandoned.

U.S. patent application Ser. No. 228,393, filed Jan. 26, 1981, a continuing application of Ser. No. 63,497, filed Aug. 3, 1979, abandoned, which is a continuing application of Ser. No. 969,602, filed Dec. 12, 1978, abandoned, in the names of George D. Myers and Lloyd E. Busch for "Multi-Stage Regeneration on Spent Catalyst."

U.S. Pat. No. 4,299,687, in the names of George D. Myers and Lloyd E. Busch for "Carbo-Metallic Oil Conversion with Controlled $CO/CO_2$ Ratio in Regeneration."

U.S. Pat. No. 4,332,673 in the name of George D. Myers for "High Metal Carbo-Metallic Oil Conversion."

U.S. Pat. No. 4,341,624, in the name of George D. Myers for "Carbo-Metallic Oil Conversion".

U.S. Pat. No. 4,347,122 in the names of George D. Myers and Lloyd E. Busch for "Carbo-Metallic Oil Conversion".

U.S. Pat. No. 4,354,923 in the names of George D. Myers and Lloyd E. Busch for "Carbo-Metallic Oil Conversion With Liquid Water in Vented Riser With Controlled $CO/CO_2$ Ratio During Catalyst Conversion."

U.S. Pat. No. 4,376,696 in the name of George D. Myers for "Addition of $MgCl_2$ to Catalyst."

U.S. Pat. No. 4,375,404 in the name of George D. Myers for "Addition of Chlorine to Regenerator".

U.S. Pat. No. 4,376,038 in the name of George D. Myers for "Use of Naphtha in Carbo-Metallic Oil Conversion."

U.S. Pat. No. 4,417,975 in the names of George D. Myers and Lloyd E. Busch for "Addition of Water to Regeneration Air."

U.S. patent application Ser. No. 252,967, filed Apr. 10, 1981 in the names of Hettinger et al for "Trapping of Metals Deposited on Catalytic Materials During Carbo-Metallic Oil Conversion," now abandoned.

U.S. Pat. No. 4,377,470 which is a continuing application of Ser. No. 255,398, filed Apr. 20, 1981, now abndoned, in the names of Hettinger, et al for "Immobilization of Vanadia Deposited on Catalytic Materials During Carbo-Metallic Oil Conversion."

U.S. patent application Ser. No. 255,931, filed Apr. 20, 1981 in the names of Hettinger et al for "Immobilization of Vanadia Deposited on Sorbent Materials During Treatment of Carbo-Metallic Oils."

U.S. patent application Ser. No. 255,965, filed Apr. 20, 1981 in the name of Stephen M. Kovach for "A Method for the Disposal of Sulfur Oxides from a Catalytic Cracking Operation", now abandoned.

U.S. Pat. No. 4,407,714 in the names of Hettinger et al for "Process for Cracking High-Boiling Hydrocarbons Using High Pore Volume, Low Density Catalyst."

U.S. Pat. No. 4,390,503 in the names of Walters et al for "Carbo-Metallic Oil Conversion with Ballistic Separation."

U.S. Pat. No. 4,454,025 in the name of William P. Hettinger for "Passivating Heavy Metals in Carbo-Metallic Oil Conversion."

U.S. Pat. No. 4,406,773 in the names of Hettinger et al for "Magnetic Separation of High Activity Catalyst from Low Activity Catalyst."

U.S. Pat. No. 4,384,948 in the name of Dwight F. Barger for "Single Unit RCC."

U.S. Pat. No. 4,374,019 in the names of Hettinger et al for "Process for Cracking High boiling Hydrocarbons Using High Ratio of Catalyst Residence Time to Vapor Residence Time."

International Application Ser. No. PCT/US81/00356, filed Mar. 19, 1981 in the names of Beck et al for "Immobilization of Vanadia Deposited on Catalytic Materials During Carbo-Metallic Oil Conversion."

International Application Ser. No. PCT/US81/00357, filed Mar. 10, 1981 in the names of Beck et al for "Immobilization of Vanadia Deposited on Sorbent Materials During Treatment of Carbo-Metallic Oils."

International Application Ser. No. PCT/US81/00492, filed Apr. 10, 1981 in the names of Hettinger et al for "Large Pore Catalyst for Heavy Hydrocarbon Conversion."

International Application Ser. No. PCT/US81/00646, filed May 13, 1981 in the names of McKay et al for "Stripping Hydrocarbons from Catalyst with Combustion Gases."

International Application Ser. No. PCT/US81/00648, filed May 13, 1981 in the names of Busch et al for "A Combination Process for Upgrading Residual Oils."

International Application Ser. No. PCT/US81/00660, filed May 13, 1981 in the name of Oliver J. Zandona for "Progressive Flow Cracking of Coal/Oil Mixtures with High Metals Content Catalyst."

International Application Ser. No. PCT/US81/00662, filed May 13, 1981 in the names of Hettinger et al for "Steam Reforming of Carbo-Metallic Oils."

U.S. Pat. No. 4,425,259 in the names of William P. Hettinger et al for "Endothermic Removal of Coke Deposited on Catalytic Material During Carbo-Metallic Oil Conversion."

U.S. Pat. No. 4,405,445 in the names of Stephen M. Kovach et al for "Homogenation of Water and Reduced Crude."

TECHNICAL FIELD

This invention relates to processes for converting heavy hydrocarbon oils into lighter fractions, and especially to processes for converting heavy hydrocarbons containing high concentrations of coke precursors and heavy metals into gasoline and other liquid hydrocarbon fuels.

BACKGROUND ART

In general, gasoline and other liquid hydrocarbon fuels boil in the range of about 100° to about 650° F. However, the crude oil from which these fuels are made contains a diverse mixture of hydrocarbons and other compounds which vary widely in molecular weight and therefore boil over a wide range. For example, crude oils are known in which 30 to 60% or more of the total volume of oil is composed of compounds boiling at temperatures above 650° F. Among these are crudes in which about 10% to about 30% or more of the total volume consists of compounds so heavy in molecular weight that they boil above 1025° F. or at least will not boil below 1025° F. at atmospheric pressure.

Because these relatively abundant high boiling components of crude oil are unsuitable for inclusion in gasoline and other liquid hydrocarbon fuels, the petroleum refining industry has developed processes for cracking or breaking the molecules of the high molecular weight, high boiling compounds into smaller molecules which do boil over an appropriate boiling range. The cracking process which is most widely used for this purpose is known as fluid catalytic cracking (FCC). Although the FCC process has reached a highly advanced state, and many modified forms and variations have been developed, their unifying factor is that a vaporized hydrocarbon feedstock is caused to crack at an elevated temperature in contact with a cracking catalyst that is suspended in the feedstock vapors. Upon attainment of the desired degree of molecular weight and boiling point reduction the catalyst is separated from the desired products.

Crude oil in the natural state contains a variety of materials which tend to have quite troublesome effects on FCC processes, and only a portion of these troublesome materials can be economically removed from the crude oil. Among these troublesome materials are coke precursors (such as asphaltenes, polynuclear aromatics, etc.), heavy metals (such as nickel, vanadium, iron, copper, etc.), lighter metals (such as sodium, potassium, etc.), sulfur, nitrogen and others. Certain of these, such as the lighter metals, can be economically removed by desalting operations, which are part of the normal procedure for pretreating crude oil for fluid catalytic cracking. Other materials, such as coke precursors, asphaltenes and the like, tend to break down into coke during the cracking operation, which coke deposits on the catalyst, impairing contact between the hydrocarbon feedstock and the catalyst, and generally reducing its potency or activity level. The heavy metals transfer almost quantitatively from the feedstock to the catalyst surface.

If the catalyst is reused again and again for processing additional feedstock, which is usually the case, the heavy metals can accumulate on the catalyst to the point that they unfavorably alter the composition of the catalyst and/or the nature of its effect upon the feedstock. For example, vanadium tends to form fluxes with certain components of commonly used FCC catalysts, lowering the melting point of portions of the catalyst particles sufficiently so that they begin to sinter and become ineffective cracking catalysts. Accumulations of vanadium and other heavy metals, especially nickel, also "poison" the catalyst. They tend in varying degrees to promote excessive dehydrogenation and aromatic condensation, resulting in excessive production of carbon and gases with consequent impairment of liquid fuel yield. An oil such as a crude or crude fraction or other oil that is particularly abundant in nickel and/or other metals exhibiting similar behavior, while containing relatively large quantities of coke precursors, is referred to herein as a carbo-metallic oil, and represents a particular challenge to the petroleum refiner.

In general, the coke-forming tendency or coke precursor content of an oil can be ascertained by determining the weight percent of carbon remaining after a sample of that oil has been pyrolyzed. The industry accepts this value as a measure of the extent to which a given oil tends to form non-catalytic coke when employed as feedstock in a catalytic cracker. Two established tests are recognized, the Conradson Carbon and Ramsbottom Carbon tests, the former being described in ASTM D189-76 and the latter being described in ASTM Test No. D524-76. In conventional FCC practice, Conradson carbon values on the order of about 0.05 to about 1.0 are regarded as indicative of acceptable feed.

Since the various heavy metals are not of equal catalyst poisoning activity, it is convenient to express the poisoning activity of an oil containing a given poisoning metal or metals in terms of the amount of a single metal which is estimated to have equivalent poisoning activity. Thus, the heavy metals content of an oil can be expressed by the following formula (patterned after that of W. L. Nelson in Oil and Gas Journal, page 143, Oct. 23, 1961) in which the content of each metal present is expressed in parts per million of such metal, as metal, on a weight basis, based on the weight of feed:

Nickel
Equivalents = $Ni + (V/4.8) + (Fe/7.1) + (Cu/1.23)$

According to conventional FCC practice, the heavy metal content of feedstock for FCC processing is controlled at a relatively low level, e.g., about 0.25 ppm Nickel Equivalents or less.

The above formula can also be employed as a measure of the accumulation of heavy metals on cracking catalyst, except that the quantity of metal employed in the formula is based on the weight of catalyst (moisture free basis) instead of the weight of feed. In conventional FCC practice, in which a circulating inventory of catalyst is used again and again in the processing of fresh feed, with periodic or continuing minor addition and withdrawal of fresh and spent catalyst, the metal content of the catalyst is maintained at a level which may for example be in the range of about 200 to about 600 ppm Nickel Equivalents.

Petroleum refiners have been investigating means for processing reduced crudes, such as by visbreaking, solvent deasphalting, hydrotreating, hydrocracking, coking, Houdresid fixed bed cracking, H-Oil, and fluid catalytic cracking. Other approaches to the processing of reduced crude to form transportation and heating fuels named Reduced Crude Conversion (RCC) after a particularly common and useful carbo-metallic feed are disclosed in U.S. Pat. Nos. 4,341,624; 4,347,122; 4,299,687; 4,354,923; 4,332,673 all filed on Nov. 14, 1979, and which are incorporated herein by reference thereto. In carrying out the processes of these applications, a reduced crude is contacted with a hot regenerated catalyst in a short contact time riser cracking zone, and the catalyst and products are separated instantaneously by means of a vented riser to take advantage of the difference between the momentum of gases and catalyst particles. The catalyst is stripped, sent to a regenerator zone and the regenerated catalyst is recycled back to the riser to repeat the cycle. Due to the high Conradson carbon values of the feed, coke deposition on the catalyst is high and can be as high as 17 wt% based on feed. This high coke level can lead to excessive temperatures in the regenerator, at times in excess of 1400° F. to as high as 1500° F., which can lead to rapid deactivation of the catalyst through hydrothermal degradation of the active cracking component of the catalyst (crystalline alumino-silicate zeolites) and unit metallurgical failure.

As described in the above-mentioned co-pending reduced crude patent applications, excessive heat generated in the regenerator is overcome by heat management through utilization of a two-stage regenerator, regeneration of a high $CO/CO_2$ ratio to take advantage of the lower heat of combustion of C to CO versus CO to $CO_2$, low feed and air preheat temperatures and water addition in the riser as a catalyst coolant.

Various embodiments of regenerators and processes of regeneration useful in processing reduced crudes are described in the above-identified U.S. patent applications, including U.S. patent application Ser. Nos. 228,393, 246,751, 246,782, 258,265 and 290,277, and the material in these applications including that relating to regeneration of catalyst is hereby incorporated by reference.

In the processes of regeneration described in these applications the spent catalyst is contained in a regeneration vessel containing one or more dense fluidized beds with a disengaging zone located above and communicating with the dense bed(s). The bed(s) are fluidized and the coke burned by flowing a combustion-supporting gas upwardly through the beds at a fluidizing velocity. Most of the particles are retained within the dense beds by limiting the velocity of the fluidizing gas so that most of the particles are not carried upwardly into the disengaging space. However, the catalyst may comprise particles having sizes ranging from about 1 to over 200 microns, and gas velocities which fluidize the larger particles may carry the small particles out of the dense bed, through the disengaging zone and out of the regenerator with the gaseous combustion products. These particles carried into the disengaging zone may be separated from the combustion gases and returned to the dense bed by separation means such as by cyclone separators located within the disengaging space which separate and return catalyst to the dense beds. The cyclones, however, are rough on catalysts, tending to break them into small particles.

The requirement for a large disengaging space and one or more cyclone separators increases the size and the cost of the regenerator and improved methods and apparatus for regenerating catalyst and separating regenerated catalyst from combustion products are desired.

SUMMARY OF THE INVENTION

It is accordingly one object of this invention to provide a method and apparatus for regenerating spent catalyst and separating regenerated catalyst from combustion products.

It is another object of this invention to provide a method and apparatus for separating regenerated catalyst from combustion products which requires a minimum amount of disengagement space above a fluidized dense bed of catalyst particles.

It is still another object to provide a method and apparatus for regenerating spent catalyst and separating regenerated catalyst from combustion products which eliminate the need for, or reduces the number of, cyclone separators for separating regenerated catalyst from gaseous combustion products.

It is still another object to provide a method and apparatus for regenerating spent catalyst and separating regenerated catalyst from combustion products which reduces the attrition of catalyst particles.

In accordance with the invention a process is provided for regenerating coke-bearing spent catalyst particles comprising: maintaining, in one or more regeneration zones, one or more fluidized catalyst regeneration beds comprising spent catalyst particles; introducing a fluidization gas including an oxygen-containing combustion-supporting gas into said regeneration bed(s) under conditions whereby said combustion supporting gas contacts said spent catalyst particles in said regeneration zone(s) under conditions of temperature, atmosphere and average residence time sufficient to burn coke on the catalyst and form gaseous combustion products and regenerated catalyst particles; passing a stream of said gaseous combustion products and regenerated catalyst particles into an upper, inlet end of an elongated chamber, said elongated chamber having an outlet section having a longitudinal axis and an open downstream end opening into a disengagement chamber; causing said stream to flow toward said downstream end of said outlet section under conditions whereby momentum is imparted to regenerated catalyst particles, and said regenerated catalyst particles reach an average linear velocity of at least about 20 feet per second; causing the regenerated catalyst particles and gaseous combustion products to move in divergent directions at the downstream end of said outlet section while the catalyst is moving under the influence of momentum imparted thereto in said elongated chamber, thereby separating at least a portion of the catalyst particles from said gaseous combustion products within said disengagement chamber; removing the separated catalyst particles from said disengagement chamber; removing gaseous combustion products from said disengagement chamber; and supplying additional spent catalyst to said regeneration bed(s).

In accordance with the invention there has also been provided apparatus for regenerating coke-bearing, spent fluidizable catalyst comprising: a vessel; an essentially gas impermeable horizontal partition disposed within said vessel, extending throughout the cross-section of the vessel at the position of the partition and dividing said vessel into an upper section containing at least one regeneration chamber and a lower section containing a disengagement chamber, said regeneration chamber having an upper zone and a lower zone; spent catalyst inlet means in said upper section of the vessel; combustion and fluidizing gas inlet means in said lower zone of said regeneration chamber to fluidize the catalyst and support combustion of coke, thereby forming gaseous combustion products and regenerated catalyst; an elongated, tubular conduit disposed within said vessel, extending from said upper zone in said regeneration chamber through said partition and into said disengagement chamber and having an inlet end in said upper zone of said regeneration chamber and an outlet section having a downstream end with a lip portion in said disengagement chamber, thereby providing a passageway for gaseous combustion products and regenerated catalyst between said upper section and said lower section; means at the outlet section of said tubular conduit for causing catalyst and combustion gases to move in divergent directions, thereby separating at least a portion of the catalyst from said stream; means for removing separated combustion gases from said disengagement chamber; and means for removing regenerated catalyst from said disengagement chamber.

This invention provides a highly efficient apparatus and method for separating regenerated catalyst from gaseous combustion products. The number of cyclones in the regenerator system may be reduced, or the cyclones may be entirely eliminated. The catalyst is not subjected to as severe attrition conditions as are encountered in cyclone separators. In addition, there is no requirement for a dilute phase, disengagement zone, above the bed of particles undergoing regeneration which reduces the size of the regeneration vessel.

DESCRIPTION OF THE INVENTION

Figure 1:
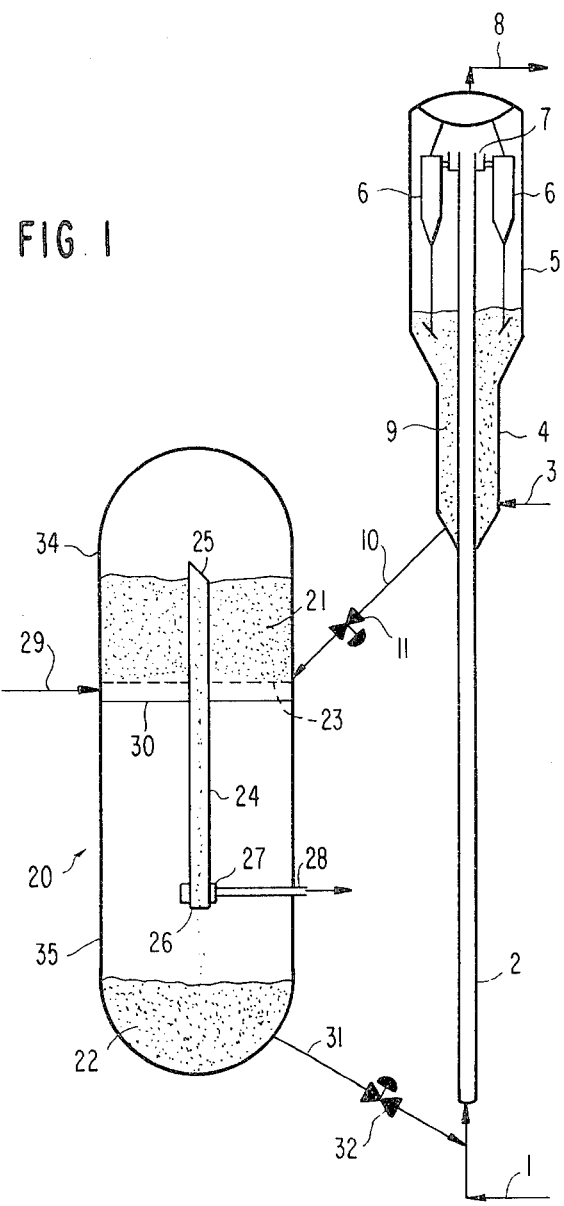
FIG. 1 is a schematic diagram of a system in which the regenerator and method of this invention may be used showing a regenerator with a single fluidized bed.

In carrying out this invention coke-bearing spent catalyst is introduced into one or more beds of fluidized catalyst particles where it is contacted with oxygen-containing combustion-supporting gas.

The catalyst may be any fluidizable catalyst including cracking catalysts, hydrogenation-dehydrogenation catalysts, aromatization catalysts, and polymerization catalysts, and is especially useful in hydrocarbon conversion processes and apparatus such as, for instance, FCC apparatus and methods used to crack gas oils, and RCC apparatus and methods used to convert carbo-metallic oils to a variety of liquid fuels.

The fluidized bed(s) and conditions of time, temperature and combustion-supporting gas within the bed(s) are established to provide the desired degree of coke burn-off. The regenerated catalyst is removed from the bed, or if there is a series of beds, from the final bed in the series by passing the regenerated catalyst into the inlet end of a downcomer conduit which extends downwardly through the bed or beds to a lower disengagement chamber. The catalyst and at least a part, and preferably all, of the combustion products pass downwardly through this conduit. During the passage through the conduit momentum is imparted to the catalyst particles as a result of the force of gravity and the force exerted upon them by the downwardly moving gaseous combustion products. The particles are ultimately separated from the gaseous combustion particles at the downstream end of the downcomer because of the greater momentum of the catalyst particles than that of the gaseous combustion products. While some separation will be achieved at lower particle velocities, it is preferred that the average linear velocity of the particles be at least 20 feet per second, and is preferably in the range of about 20 feet per second to 120 feet per second, and most preferably in the range of about 35 feet per second to 100 feet per second. The desired particle velocity can be achieved by appropriately sizing the diameter of the downcomer to achieve a gas velocity greater than the desired particle velocity. The velocity of gases at the downstream end of the downcomer is preferably from about 0 to about 50 feet per second greater than the desired particle velocity. The length of the downcomer is usually established by equipment limitations rather than process considerations since it must extend through at least one fluidized bed and into the disengagement chamber. However, a length of at least about 10 feet is preferred so that the particles can attain the desired velocity at the downstream end with readily attainable gas velocities.

Means are provided at the downstream end of the downcomer to cause the catalyst particles and gaseous combustion products to move in different directions, thus separating them. While means may be provided to change the direction of the catalyst particles, an undesirable increase in the attrition of the particles may result. Therefore, in the preferred method of carrying out the invention the catalyst particles upon exiting from the downstream end are permitted to follow a substantially straight line path, while the combustion gases are caused to change direction. This may be accomplished, for example, by providing a port in the sidewall of an outlet section of the downcomer which communicates with a passageway for the gaseous combustion products to a zone outside the disengagement chamber. Apparatus which is readily adaptable for carrying out solids-gas separation in accordance with this method is described in U.S. Pat. No. 4,070,159 issued Jan. 24, 1978 to George D. Myers et al for "Apparatus for Separating Solid Disperoids from Gaseous Streams."

The preferred means for effecting the separation of regenerated catalyst from gaseous combustion products includes a means for making the product vapors make a turn or change of direction which exceeds 90°. This may be accomplished, for example, by providing an annular cup-like member surrounding the downcomer tube at the lower end in a manner similar to that shown in U.S. Pat. No. 4,390,503 in the names of Walters et al for "Carbo-Metallic Oil Conversion with Ballistic Separation." In this embodiment the apparatus for separating regenerated catalyst from gaseous combustion products includes a cup or shroud at least partially enclosing the outlet section of the downcomer which functions as a momentum-imparting zone for the regenerated catalyst. The shroud includes an outer wall spaced from the outlet section to form a collection flow passageway therebetween. The shroud also includes at least one outlet port in fluid communication with the collection flow passageway for transporting the gaseous combustion products from the shroud. During operation, the gaseous combustion products, under the influence of a negative pressure differential from the interior of the downcomer to the interior of the outlet port, exit the reaction zone through the outlet section and are directed through the shroud collection flow passageway and into at least one outlet port, while the momentum of the regenerated catalyst particles prevents diversion of these particles into the shroud.

More details concerning this and other aspects of the apparatus and method are described below in the discussions of the drawings.

DETAILED DESCRIPTION OF THE DRAWINGS

Referring in detail to FIG. 1, hydrocarbon feed is introduced into riser reactor 2 through feed line 1 where it is mixed with hot, regenerated catalyst coming from regenerator vessel 20 through line 31. The flow of catalyst from regenerator 20 is controlled by valve 32.

The hydrocarbon feed is cracked in riser 2 and the resulting mixture of gaseous hydrocarbon products and spent catalyst passes upwardly into separation chamber 5. The spent catalyst continues in an upward direction established by the riser reactor and falls into bed 9 of spent catalyst in catalyst collection zone 4. The gaseous hydrocarbon products change direction and flow into annular space 7 and then pass into cyclone separation means 6 to separate them from catalyst fines, and leave through product line 8.

The spent catalyst in bed 9 is stripped by stripping gas introduced into the bed through line 3. The spent, stripped catalyst is passed into regenerator 20 through line 10 into fluidized bed 21, the rate of flow being controlled by valve 11. The regenerator 20 is divided into a regeneration compartment 34 and a regenerated catalyst separation and collection compartment 35 by solid divider 30.

The spent catalyst in bed 21 is fluidized and the coke thereon is combusted by a combustion-supporting oxygen-containing gas introduced into the regeneration compartment 34 through line 29 and upwardly into bed 21 through porous plate 23.

The regenerated catalyst and gaseous combustion products flow into downcomer 24 through upper inlet 25. The catalyst particles passing downwardly through the downcomer are accelerated by the downward movement of gaseous combustion products and the force of gravity. The catalyst particles as they leave downcomer 24 to outlet 26 continue in a straight line direction and are collected in bed 22. The gaseous combustion products are diverted into annular zone 27 and then outwardly through line 28.

Figure 2:
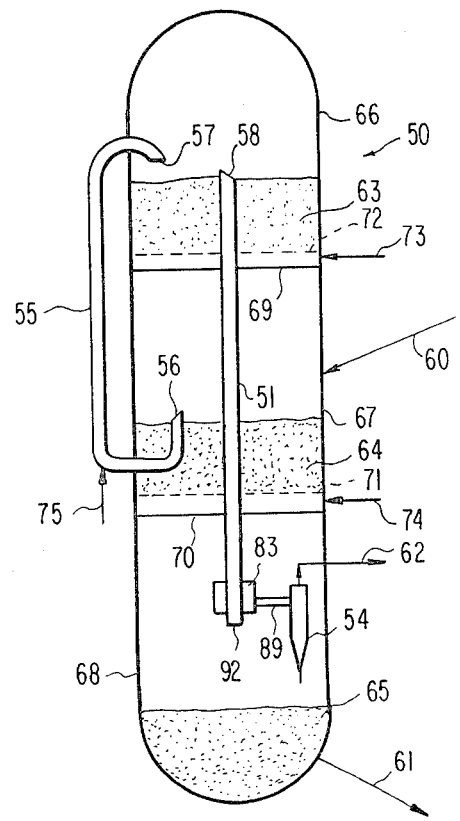
FIG. 2 is a schematic diagram of an embodiment of this invention showing a regenerator incorporating this invention having two fluidized beds.

FIG. 2 illustrates an embodiment having more than one regeneration zone, which affords the advantage of providing a more uniform residence time for the catalyst than does a regenerator having a single fluidized bed. As shown in FIG. 2, regenerator 50 is divided into three compartments by solid plates 69 and 70. Catalyst from a reactor is introduced by conduit 60 into chamber 67 comprising catalyst bed 64 where it is contacted with combustion supporting gases flowing from line 74 through porous plate 71. The partially regenerated catalyst flows into catalyst transfer line 55 through opening 56. The catalyst is carried upwardly through line 55 by the combustion gases produced in regeneration chamber 67 and by gas introduced into line 55 through line 75. These catalyst particles and the combustion gases pass upwardly into regeneration chamber 66 through outlet 57. The catalyst particles in bed 63 within chamber 66 are fluidized and regenerated further by combustion supporting gas introduced through line 73 and porous plate 72. The regenerated catalyst in bed 63 enters downcomer 51 through opening 58 and is accelerated in the downward direction by combustion products which originate within chamber 66 and those which are transferred into this chamber 66 from chamber 67. The stream of catalyst particles and combustion gases exit downcomer 51 at outlet 92 and the catalyst particles continue in a straight line and are collected in bed 65 in the lower portion of chamber 68. The gaseous combustion products are diverted into collection passageway 83 and they pass from there into cyclone 54 through conduit 89. The gaseous combustion products exit through line 62, and the regenerated catalyst returns to the reactor through line 61.

Figure 3:
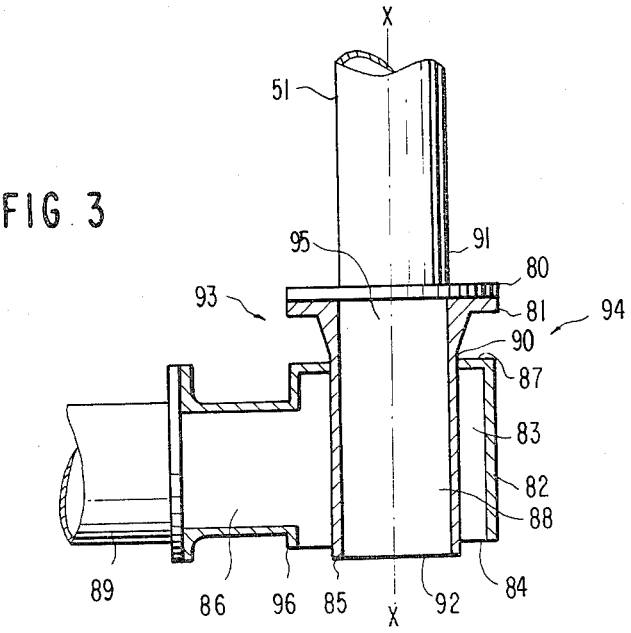
FIG. 3 is a schematic diagram of one embodiment of a separation means useful in this invention.

FIG. 3 shows in enlarged vertical cross-section details of a preferred embodiment of the gas/solids separation equipment.

The separation apparatus includes an outlet section, which may be any hollow member defining a passageway which either constitutes part of the tubular downcomer itself and includes its outlet end, or is an extension or branch of the downcomer which is in direct communication with the chamber for receiving a stream including catalyst particles and gaseous combustion products. In certain instances there will be no discernible line of demarcation between the outlet section and upstream portions of the downcomer, i.e. they can both be part of the same length of pipe. In other instances, as disclosed herein, the apparatus 94 includes a hollow outlet section 90 having an end flange 81 compatible in size with and secured, such as bolting or welding (not shown), to a downstream end flange 80 of lower end 91 of downcomer 51. Outlet section 90 may instead be an integral extension of downcomer 51 or may be but welded to lower end 91 to eliminate flanges 80 and 81.

As shown in the drawing, passageway 88 has a circular cross-section of substantially uniform cross-section throughout substantially its entire length, an inlet portion 95 terminating with an outlet portion 92, having a terminal lip 85. As will be explained hereinafter, the outlet portion 92 and lip 85 may be of the same, larger or smaller cross-sectional area as the inlet portion 95 and/or the downcomer 51 internal cross-section. Moreover, it is not essential that the passageway 88, lip 85, and outlet portion 92 and 95 be of circular cross-sections. Other regular and irregular shapes are contemplated and acceptable. The downcomer may include one or more bends intermediate the upstream and downstream ends, and the invention is useable with tubular members of this type. A sharp bend in the downcomer can substantially decelerate the catalyst particles. Thus, if there is a significant bend a short distance upstream of the outlet section outlet portion 92, and if the resultant reduction in catalyst velocity severely impairs the separation efficiency of the device, it may be desirable or necessary to increase the radius of the bend and/or move it further upstream relative to the outlet portion 92. This will permit the catalyst particles to reaccelerate before reaching the outlet portion. In the present embodiment however, the outlet section 90 and its discharge flow passageway 88 have a longitudinal axis X—X which is coincident with the longitudinal axis of the flow passageway which exists throughout the length of straight riser 51, only the downstream end 91 of which is shown in FIG. 3. It is also preferred that inlet portion 95 and outlet portion 92 be in substantial axial alignment with one another to provide a continuous discharge flow passageway for gaseous combustion products and solid catalyst particles flowing from downcomer 51.

For best results, it is presently recommended that the outlet section 88 be positioned with its longitudinal axis X—X vertical or near vertical, e.g. if desired the axis may be canted from the vertical by an angle of up to about 30°, more preferably up to about 20°, and still more preferably up to about 10°. The use of larger angles is contemplated, but losses of efficiency are experienced as the above-mentioned angle is increased.

Separation apparatus 94 further includes a shroud assembly 93 which at least partially encloses outlet section 90. In a preferred embodiment, as viewed in cross-section perpendicular to outlet section axis X—X, shroud assembly 93 is an annulus surrounding the outline of outlet section 90. However, it is considered within the scope of the present invention to employ a shroud assembly extending adjacent to any substantial portion (including all) of the above-mentioned outline of outlet section 90. Shroud assembly 93 includes an outer wall portion 82 extending substantially parallel to the longitudinal axis through outlet section 90. Shroud assembly 93 also includes a connecting wall portion 87 extending inwardly from the outer wall portion 82 toward the outer wall of outlet section 90. It is preferred but not required that there be at least a partial closure of the upstream (based on the direction of flow in downcomer 51) end of shroud 93. However, a gap, opening or openings in connecting wall portion 87 can prove useful from the standpoint of accommodating differential expansion and contraction of the shroud and outlet section. Outer wall portion 82 and connecting wall portion 87 (when present) define a substantially cup-shaped shroud, which is a preferred embodiment.

Outer wall portion 82, with or without connecting wall 87, cooperates with outlet section 90 to define a collection flow passageway 83 therebetween. In a preferred embodiment of the present invention, collection flow passageway 83 exhibits an annular cross-section extending the entire length of outer wall portion 82. However, other cross-sectional shapes are contemplated and acceptable.

At least one outlet port 86 is formed through a portion of shroud 93 and preferably through an outer wall portion 82. However, the outlet port may be provided in connecting wall 87. Outlet port 86 serves to provide a fluid passageway between collection flow passageway 83 and a hollow shroud 93 to a second stage separation device such as a conventional cyclone assembly not shown.

As seen in FIG. 2, separation apparatus 94 as well as the attached downstream end portion of downcomer 91 are located within a disengagement chamber 68. The second stage separation or cleaning device of the type referred to hereabove may or may not be located within the disengagement chamber 68. According to a preferred embodiment, the only exit path from the disengagement chamber 68 for gaseous combustion products discharged from downcomer 51 is through outlet port 86 and into outlet conduit 89.

While for purposes of simplicity, only a single outlet port 86 is shown in FIG. 3, it is within the scope of the present invention for a plurality of separation outlet portions 86 to extend through separation portions of shroud outer wall 82.

It is further noted that outlet port 86 may be located either adjacent to (not shown) or upstream (as shown) from the discharge end of lip portion 85. In order to locate port 86 adjacent lip 85, the height or downstream extension of shroud outer wall 82 may be extended downstream of lip 85. Depending on the size of tubular riser 91 and disengagement chamber 68, any number of separate outlet ports 86 may be circumferentially spaced from one another about outer wall portion 82, with each outlet port having its own outlet conduit 89. Alternatively, a plurality of outlet ports 86 may lead to a single outlet conduit 89 through a common flow manifold or the like.

Adherence to the following recommendations may be of assistance in attaining high levels of operating efficiency in separation apparatus 94. More particularly, it is preferred to locate edge portion 96 of shroud 93 in a zone extending up to about 2D upstream or up to about 3D downstream of lip portion 85. Preferably, edge 96 is located between about D upstream and D downstream from lip 85. More preferably, said zone extends from about D/3 upstream to about D/6 downstream of lip portion 85. Presently it appears that the optimum position of edge 96 is substantially D/5 upstream where D is the effective diameter of the downstream end of outlet section 90. As shown in the drawing, edge 96 is spaced outwardly from outlet section 90 to form an inlet 84 for collection flow passageway 83.

In the preceding discussion, D refers to the effective diameter of the transverse cross-sectional open area of the downstream end of outlet section 90. Said open end may or may not be circular, and may or may not be subdivided into two or more openings, in which event there may be no diameter in the usual sense of the word. The effective diameter of the total open area of the opening(s) may be determined in any suitable manner, such as for example by application of the formula $D = \sqrt{4A/\pi}$, wherein A is the combined inside transverse cross-sectional area of said opening(s).

According to the particularly preferred embodiment referred to above, the lip portion 85 projects downstream of shroud edge 96. Thus, the shroud edge 96 is preferably upstream of lip portion 85 by a distance in the range of about D/20 to about 2D, preferably about D/12 to about D, and more preferably about D/3 to about D/8.

As shown in FIG. 2, the outlet section 90 discharges the catalyst into a space downstream of its outlet end. In this embodiment the catalyst particles are projected along discharge paths having components of motion in the downstream direction, based on the direction of motion of the catalyst and gaseous combustion products stream in outlet section 90. Moreover, the product vapors are projected from the downstream end of outlet sections 90 as a stream which diverges outwardly from the catalyst path and from axis X—X.

If and when lip portion 85 projects downstream of shroud edge 96, the gaseous conversion products of hydrocarbon cracking can be forced to flow around the corner formed by lip portion 85 before entering collection flow passageway 83.

This embodiment illustrates how the major portion of the product vapors which have been discharged from the downstream end of outlet section 90 can be caused to divert from longitudinal axis X—X by an angle of divergence of at least about 45° and, in a predetermined portion of said disengagement chamber 68 adjacent the downstream end of outlet section 90, can be formed into a coherent stream for collection and removal. Preferred embodiments of said angle are at least about 90° and more preferably at least about 105°.

The stream of gaseous combustion products and solid catalyst particles may flow through the downcomer at velocities of about 20–120 (or even more) feet per second. As the stream flows through the downstream end of the outlet section 90, it may be desirable to adjust the stream velocity by reducing or increasing the cross-section of passageway 88 in the downstream direction. For a relatively slow velocity stream flowing through the downcomer, such as about 20 feet per second, it may be desirable to decrease the cross-section of the passageway 88 to increase the velocity of the stream prior to discharge from the outlet section. Alternatively, if a relatively high velocity stream of gases and particles is flowing through the riser, e.g. greater than about 120 feet per second, it may be desirable to increase the cross-section of passageway 88 to decrease the velocity of the stream prior to discharge from the outlet section.

In a like manner, the cross-section of the shroud inlet 84 or collection passageway 83 at least partially enclosing outlet section 90 should be small enough in comparison to the area of downstream open end of the outlet section to minimize the opportunity for catalyst particles to be carried into the shroud 93. At the same time, the cross-sectional area of the shroud collection passageway 83 should be large enough to prevent excessive increases in the velocity of the stream upon entering the shroud, thereby preventing the stream from undergoing excessive pressure drops as well as preventing significant abrasion of shroud passageway surfaces. When discharge velocities of substantially 45 feet per second occur, it is considered that a ratio of shroud collection area to downcomer discharge area of for example about 0.7 will ensure non-excessive stream velocities through the shroud. Likewise, when downcomer discharge velocities of 80 feet per second occur, it is considered that a discharge area to collection area ratio of about one is an exemplary value which will avoid excessive stream velocities through the shroud. These ratios are only considered illustrative of the range of values which can prove effective at maintaining non-excessive stream velocities required to avoid abrasive wear and excessive pressure drops downstream of the shroud assembly. It is considered within the scope of the present invention to increase or decrease the area ratio as required to achieve these goals. In the design of the equipment, one will of course properly size the system components and adjust downstream processing equipment to provide adequate pressure drop from the downcomer discharge to the outlet 89 to promote flow of the product vapors from the outlet section 90 to outlet 89 and from thence to downstream processing equipment such as cyclones.

It is also considered desirable that the shroud outlet port be shaped to ensure that the stream does not undergo an excessive increase in velocity while flowing from the shroud collection passageway 83 into and through the outlet port 86. According to one illustrative embodiment, the area of the outlet port (or ports) is sufficient to maintain the stream velocity at about the same level as occurs in the shroud collection passageway.

Best and Other Illustrative Mode for Carrying Out the Invention

The present invention may be used in any catalytic process for converting hydrocarbon oils to other products, it is useful in FCC processes used to crack gas oils and it is particularly useful in RCC processes used to convert carbo-metallic oils to liquid fuels, and will be illustrated in detail with respect to such a process.

Hydrocarbon Feed

This process is applicable to carbo-metallic oils whether of petroleum origin or not. For example, provided they have the requisite boiling range, carbon residue on pyrolysis and heavy metals content, the invention may be applied to the processing of such widely diverse materials as heavy bottoms from crude oil, heavy bitumen crude oil, those crude oils known as "heavy crude" which approximate the properties of reduced crude, shale oil, tar sand extract, products from coal liquification and solvated coal, atmospheric and vacuum reduced crude, extracts and/or bottoms (raffinate) from solvent deasphalting, aromatic extract from lube oil refining, tar bottoms, heavy cycle oil, slop oil, other refinery waste streams and mixtures of the foregoing. Such mixtures can for instance be prepared by mixing available hydrocarbon fractions, including oils, tars, pitches and the like. Also, powdered coal may be suspended in the carbo-metallic oil. A method of processing reduced crude containing coal fines is described in International Patent Application No. PCT/US81/00660, filed May 13, 1981 in the name of Oliver J. Zandona and entitled "Progressive Flow Cracking of Coal/Oil Mixtures with High Metals Content Catalyst," and the disclosure of that application is hereby incorporated by reference.

Persons skilled in the art are aware of techniques for demetalation of carbo-metallic oils, and demetalated oils may be converted but the invention can employ as feedstock carbo-metallic oils that have had no prior demetalation treatment. Likewise, the invention can be applied to hydrotreated feedstocks or to carbo-metallic oils which have had substantially no prior hydrotreatment. However, the preferred application of the process is to reduced crude, i.e., that fraction of crude oil boiling at and above 650° F., along or in admixture with virgin gas oils. While the use of material that has been subjected to prior vacuum distillation is not excluded the invention can be used to satisfactorily process material which has had no prior vacuum distillation, thus saving on capital investment and operating costs as compared to conventional FCC processes that require a vacuum distillation unit.

In accordance with one aspect of the invention one provides a carbo-metallic oil feedstock, at least about 70%, more preferably at least about 85% and still more preferably about 100% (by volume) of which boils at and above about 600° F. All boiling temperatures herein are based on standard atmospheric pressure conditions. In carbo-metallic oil partly or wholly composed of material which boils at and above about 650° F., such material is referred to herein as 650° F.+ material; and 650+ material which is part of or has been separated from an oil containing components boiling above and below 650° may be referred to as a 650°+ fraction. But the terms "boils above" and "650° F.+" are not intended to imply that all of the material characterized by said terms will have the capability of boiling. The carbo-metallic oils contemplated by the invention may contain material which may not boil under any conditions; for example, certain asphalts and asphaltenes may crack thermally during distillation, apparently without boiling. Thus, for example, when it is said that the feed comprises at least about 70% by volume of material which boils above about 650° F., it should be understood that the 70% in question may include some material which will not boil or volatilize at any temperature. These non-boilable materials when present, may frequently or for the most part be concentrated in portions of the feed which do not boil below about 1000° F., 1025° F. or higher. Thus, when it is said that at least about 10%, more preferably about 15%, and still more preferably at least about 20% (by volume) of the 650° F.+ fraction will not boil below about 1000° F. or 1025° F., it should be understood that all or any part of the material not boiling below about 1000° or 1025° F., may not be volatile at and above the indicated temperatures.

Preferably, the contemplated feeds, or at least the 650° F.+ material therein, have a carbon residue on pyrolysis of at least about 2 or greater. For example, the Conradson carbon content may be in the range of about 2 to about 12 and most frequently at least about 4. A particularly common range is about 4 to about 8. Those feeds having a Conradson carbon content greater than about 6 may need special means for controlling excess heat in the regenerator.

Preferably, the feed has an average composition characterized by an atomic hydrogen to carbon ratio in the range of about 1.2 to about 1.9, and preferably about 1.3 to about 1.8.

The carbo-metallic feeds employed in accordance with the invention, or at least the 650° F.+ material therein, may contain at least about 4 parts per million of Nickel Equivalents, as defined above, of which at least about 2 parts per million is nickel (as metal, by weight). Carbo-metallic oils within the above range can be prepared from mixtures of two or more oils, some of which do and some of which do not contain the quantities of Nickel Equivalents and nickel set forth above. It should also be noted that the above values for Nickel Equivalents and nickel represent time-weighted averages for a substantial period of operation of the conversion unit, such as one month, for example. It should also be noted that the heavy metals have in certain circumstances exhibited some lessening of poisoning tendency after repeated oxidations and reductions on the catalyst, and the literature describes criteria for establishing "effective metal" values. For example, see the article by Cimbalo, et al., entitled "Deposited Metals Poison FCC Catalyst," *Oil and Gas Journal,* May 15, 1972, pp 112–122, the contents of which are incorporated herein by reference. If considered necessary or desirable, the contents of Nickel Equivalents and nickel in the carbo-metallic oils processed according to the invention may be expressed in terms of "effective metal" values. Notwithstanding the gradual reduction in poisoning activity noted by Cimbalo, et al., the regeneration of catalyst under normal FCC regeneration conditions may not, and usually does not, severely impair the dehydrogenation, demethanation and aromatic condensation activity of heavy metals accumulated on cracking catalyst.

It is known that about 0.2 to about 4 weight percent of "sulfur" in the form of elemental sulfur and/or its compounds (but reported as elemental sulfur based on the weight of feed) appears in FCC feeds and that the sulfur and modified forms of sulfur can find their way into the resultant gasoline product and, where lead is added, tend to reduce its suceptibility to octane enhancement. Sulfur in the product gasoline often requires sweetening when processing high sulfur containing crudes. To the extent that sulfur is present in the coke, it also represents a potential air pollutant since the regenerator burns it to $SO_2$ and $SO_3$. However, we have found that in our process the sulfur in the feed is on the other hand able to inhibit heavy metal activity by maintaining metals such as Ni, V, Cu and Fe in the sulfide form in the reactor. These sulfides are much less active than the metals themselves in promoting dehydrogenation and coking reactions. Accordingly, it is acceptable to carry out the invention with a carbo-metallic oil having at least about 0.3%, acceptably more than about 0.8% and more acceptably at least about 1.5% by weight of sulfur in the 650° F.+ fraction. A method of reducing pollutants from sulfur is described in copending U.S. patent application Ser. No. 255,965, filed Apr. 20, 1981 in the name of Stephen M. Kovach for "A Method for the Disposal of Sulfur Oxides from a Catalytic Cracking Operation," now abandoned.

The carbo-metallic oils useful in the invention may and usually do contain significant quantities of heavy, high boiling compounds containing nitrogen, a substantial portion of which may be basic nitrogen. For example, the total nitrogen content of the carbo-metallic oils may be at least about 0.05% by weight. Since cracking catalysts owe their cracking activity to acid sites on the catalyst surface or in its pores, basic nitrogen-containing compounds may temporarily neutralize these sites, poisoning the catalyst. However, the catalyst is not permanently damaged since the nitrogen can be burned off the catalyst during regeneration, as a result of which the acidity of the active sites is restored.

The carbo-metallic oils may also include significant quantities of pentane insolubles, for example at least about 0.5% by weight, and more typically 2% or more or even about 4% or more. These may include for instance asphaltenes and other materials.

Alkali and alkaline earth metals generally do not tend to vaporize in large quantities under the distillation conditions employed in distilling crude oil to prepare the vacuum gas oils normally used as FCC feedstocks. Rather, these metals remain for the most part in the "bottoms" fraction (the non-vaporized high boiling portion) which may for instance be used in the production of asphalt or other by-products. However, reduced crude and other carbo-metallic oils are in many cases bottoms products, and therefore may contain significant quantities of alkali and alkaline earth metals such as sodium. These metals deposit upon the catalyst during cracking. Depending on the composition of the catalyst and magnitude of the regeneration temperatures to which it is exposed, these metals may undergo interactions and reactions with the catalyst (including the catalyst support) which are not normally experienced in processing VGO under conventional FCC processing conditions. If the catalyst characteristics and regeneration conditions so require, one will of course take the necessary precautions to limit the amounts of alkali and alkaline earth metal in the feed, which metals may enter the feed not only as brine associated with the crude oil in its natural state, but also as components of water or steam which are supplied to the cracking unit. Thus, careful desalting of the crude used to prepare the carbo-metallic feed may be important when the catalyst is particularly susceptible to alkali and alkaline earth metals. In such circumstances, the content of such metals (hereinafter collectively referred to as "sodium") in the feed can be maintained at about 1 ppm or less, based on the weight of the feedstock. Alternatively, the sodium level of the feed may be keyed to that of the catalyst, so as to maintain the sodium level of the catalyst which is in use substantially the same as or less than that of the replacement catalyst which is charged to the unit.

According to a particularly preferred embodiment of the invention, the carbo-metallic oil feedstock constitutes at least about 70% by volume of material which boils above about 650° F., and at least about 10% of the material which boils above about 650° F. will not boil below about 1025° F. The average composition of this 650° F.+ material may be further characterized by: (a) an atomic hydrogen to carbon ratio in the range of about 1.3 to about 1.8; (b) Conradson carbon value of at least about 2; (c) at least about four parts per million of Nickel Equivalents, as defined above, of which at least about two parts per million is nickel (as metal, by weight); and (d) at least one of the following: (i) at least about 0.3% by weight of sulfur, (ii) at least about 0.5% by weight of pentane insolubles. Very commonly, the preferred feed will include all of (i), (ii), and other components found in oils of petroleum and non-petroleum origin may also be present in varying quantities providing they do not prevent operation of the process.

Although there is no intention of excluding the possibility of using a feedstock which has previously been subjected to some cracking, the present invention can be used to successfully produce large conversions and very substantial yields of liquid hydrocarbon fuels from carbo-metallic oils which have not been subjected to any substantial amount of cracking. Thus, for example, and preferably, at least about 85%, more preferably at least about 90% and most preferably substantially all of the carbon-metallic feed introduced into the present process is oil which has not previously been contacted with cracking catalyst under cracking conditions. Moreover, the process of the invention is suitable for operation in a substantially once-through or single pass mode. Thus, the volume of recycle, if any, based on the volume of fresh feed is preferably about 15% or less and more preferably about 10% or less.

The invention described in this specification may be employed in the processes and apparatuses for carbometallic oil conversion described in U.S. Pat. Nos. 4,299,687; 4,322,673; 4,341,624; 4,347,122; 4,354,923 and Pat. Nos. 4,376,696; 4,375,404; 4,376,038; said patents being in the name of George D. Myers alone or jointly with Lloyd E. Busch and assigned or to be assigned to Ashland Oil, Inc., and the entire disclosure of each of said applications being incorporated herein by reference. While the processes described in these applications can handle reduced crudes or crude oils containing high metals and Conradson carbon values not susceptible previously to direct processing, certain crudes such as Mexican Mayan or Venezuelan and certain other types of oil feeds contain abnormally high heavy metals and Conradson carbon values. If these very poor grades of oil are processed in a carbo-metallic process, they may lead to uneconomical operations because of high heat loads on the regenerator and/or high catalyst addition rates to maintain adequate catalyst activity and/or selectivity. In order to improve the grade of very poor grades of oil, such as those containing more than 50 ppm heavy metals and/or more than 10 weight percent Conradson carbon, these oils may be pretreated with a sorbent to reduce the levels of these contaminants to the aforementioned or lower values. Such upgrading processes are described in U.S. Pat. No. 4,263,128 of Apr. 21, 1981, in the name of David B. Bartholic, the entire disclosure of said patent being incorporated herein by reference.

CATALYST

In general, the weight ratio of catalyst to fresh feed (feed which has not previously been exposed to cracking catalyst under cracking conditions) used in the process is in the range of about 3 to about 18. Preferred and more preferred ratios are about 4 to about 12, more preferably about 5 to about 10 and still more preferably about 6 to about 10, a ratio of about 10 presently being considered most nearly optimum. Within the limitations of product quality requirements, controlling the catalyst to oil ratio at relatively low levels within the aforesaid ranges tends to reduce the coke yield of the process, based on fresh feed.

In conventional FCC processing of VGO, the ratio between the number of barrels per day of plant throughput and the total number of tons of catalyst undergoing circulation throughout all phases of the process can vary widely. For purposes of this disclosure, daily plant throughput is defined as the number of barrels of fresh feed boiling above about 650° F. which that plant processes per average day of operation to liquid products boiling below about 430° F.

The present invention may be practiced in the range of about 2 to about 30 tons of catalyst inventory per 1000 barrels of daily plant throughput. Based on the objective of maximizing contact of feed with fresh catalyst, it has been suggested that operating with about 2 to about 5 or even less than 2 tons of catalyst inventory per 1000 barrels of daily plant throughput is desirable when operating with carbo-metallic oils. However, in view of disclosures in "Deposited Metals Poison FCC Catalyst," Cimbalo, et al., op ct., one may be able, at a given rate of catalyst replacement, to reduce effective metals levels on the catalyst by operating with a higher inventory, say in the range of about 12 to about 20 tons per 1000 barrels of daily throughput capacity.

In the practice of the invention, catalyst may be added continuously or periodically, such as, for example to make up for normal losses of catalyst from the system. Moreover, catalyst addition may be conducted in conjunction with withdrawal of catalyst, such as, for example, to maintain or increase the average activity level of the catalyst in the unit. For example, the rate at which virgin catalyst is added to the unit may be in the range of about 0.1 to about 3, more preferably about 0.15 to about 2, and most preferably about 0.2 to about 1.5 pounds per barrel of feed. If on the other hand equilibrium catalyst from FCC operation is to be utilized, replacement rates as high as about 5 pounds per barrel can be practiced.

Where circumstances are such that the catalyst employed in the unit is below average in resistance to deactivation and/or conditions prevailing in the unit are such as to promote more rapid deactivation, one may employ rates of addition greater than those stated above; but in the opposite circumstances, lower rates of addition may be employed. By way of illustration, if a unit were operated with a metal(s) loading of 5000 ppm Ni+V in parts by weight on equilibrium catalyst, one might for example employ a replacement rate of about 2.7 pounds of catalyst introduced for each barrel (42 gallons) of feed processed.

However, operation at a higher level such as 10,000 ppm Ni+V on catalyst would enable one to substantially reduce the replacement rate, such as for example to about 1.3 pounds of catalyst per barrel of feed. Thus, the levels of metal(s) on the catalyst and catalyst replacement rates may in general be respectively increased and decreased to any value consistent with the catalyst activity which is available and desired for conducting the process.

U.S. Pat. No. 4,406,773 in the names of William P. Hettinger, Jr. et al for "Magnetic Separation of High Activity Catalyst From Low Activity Catalyst" discloses a method of reducing the rate of replacing catalyst and the entire disclosure of said application is hereby incorporated by reference.

Without wishing to be bound by any theory, it appears that a number of features of the process to be described in greater detail below, such as, for instance, the residence time and optional mixing of steam with the feedstock, tend to restrict the extent to which cracking conditions produce metals in the reduced state on the catalyst from heavy metal sulfide(s), sulfate(s) or oxide(s) deposited on the catalyst particles by prior exposures of carbo-metallic feedstocks and regeneration conditions. Thus, the process appears to afford significant control over the poisoning effect of heavy metals on the catalyst even when the accumulations of such metals are quite substantial.

Accordingly, the process may be practiced with catalyst bearing accumulations of heavy metal(s) in the form of elemental metal(s), oxide(s), sulfide(s) or other compounds which heretofore would have been considered quite intolerable in conventional FCC-VGO operations. Thus, operation of the process with catalyst bearing heavy metals accumulations in the range of about 3,000 or more ppm Nickel Equivalents, on the average, is contemplated. The concentration of Nickel Equivalents of metals on catalyst can range up to about 40,000 ppm or higher. More specifically, the accumulation may be in the range of about 3,000 to about 30,000 ppm, preferably in the range of 3,000 to 20,000 ppm, and more preferably about 3,000 to about 12,000 ppm. Within these ranges just mentioned, operation at metals levels of about 4,000 or more, about 5,000 or more, or about 7,000 or more ppm can tend to reduce the rate of catalyst replacement required. The foregoing ranges are based on parts per million of Nickel Equivalents, in which the metals are expressed as metal, by weight, measured on and based on regenerated equilibrium catalyst. However, in the event that catalyst of adequate activity is available at very low cost, making feasible very high rates of catalyst replacement, the carbo-metallic oil could be converted to lower boiling liquid products with catalyst bearing less than 3,000 ppm Nickel Equivalents of heavy metals. For example, one might employ equilibrium catalyst from another unit, for example, an FCC unit which has been used in the cracking of a feed, e.g., vacuum gas oil, having a carbon residue on pyrolysis of less than 1 and containing less than about 4 ppm Nickel Equivalents of heavy metals.

In any event, the equilibrium concentration of heavy metals in the circulating inventory of catalyst can be controlled (including maintained or varied as desired or needed) by manipulation of the rate of catalyst addition discussed above. Thus, for example, addition of catalyst may be maintained at a rate which will control the heavy metals accumulation on the catalyst in one of the ranges set forth above.

In general, it is preferred to employ a catalyst having a relatively high level of cracking activity, providing high levels of conversion and productivity at low residence times. The conversion capabilities of the catalyst may be expressed in terms of the conversion produced during actual operation of the process and/or in terms of conversion produced in standard catalyst activity tests. For example, it is preferred to employ catalyst which, in the course of extended operation under prevailing process conditions, is sufficiently active for sustaining a level of conversion of at least about 50% and more preferably at least about 60%. In this connection, conversion is expressed in liquid volume percent, based on fresh feed.

Also, for example, the preferred catalyst may be defined as one which, in its virgin or equilibrium state, exhibits a specified activity expressed as a percentage in terms of MAT (micro-activity test) conversion. For purposes of the present invention the foregoing percentage is the volume percentage of standard feedstock which a catalyst under evaluation will convert to 430° F. end point gasoline, lighter products and coke at 900° F., 16 WHSV (weight hourly space velocity, calculated on a moisture free basis, using clean catalyst which has been dried at 1100° F., weighed and then conditioned, for a period of at least 8 hours at about 25° C. and 50% relative humidity, until about one hour or less prior to contacting the feed) and 3C/O (catalyst to oil weight ratio) by ASTM D-32 MAT test D-3907-80, using an appropriate standard feedstock, e.g. a sweet light primary gas oil, such as that used by Davison, Division of W. R. Grace, having the following analysis and properties:

| | |
|---|---|
| API Gravity at 60° F., degrees | 31.0 |
| Specific Gravity at 60° F., g/cc | 0.8708 |
| Ramsbottom Carbon, wt. % | 0.09 |
| Conradson Carbon, wt % | 0.04 |
| Carbon, wt. % | 84.92 |
| Hydrogen, wt. % | 12.94 |
| Sulfur, wt. % | 0.68 |
| Nitrogen, ppm | 305 |
| Viscosity at 100° F., centistokes | 10.36 |
| Watson K Factor | 11.93 |
| Aniline Point | 182 |
| Bromine No. | 2.2 |
| Paraffins, Vol. % | 31.7 |
| Olefins, Vol. % | 1.6 |
| Naphthenes, Vol. % | 44.0 |
| Aromatics, Vol. % | 22.7 |
| Average Molecular Weight | 284 |
| Nickel | Trace |
| Vanadium | Trace |
| Iron | Trace |
| Sodium | Trace |
| Chlorides | Trace |
| B S & W | Trace |

| Distillation | ASTM D-1160 |
|---|---|
| IBP | 445 |
| 10% | 601 |
| 30% | 664 |
| 50% | 701 |
| 70% | 734 |
| 90% | 787 |
| FBP | 834 |

The gasoline end point and boiling temperature-volume percent relationships of the product produced in the MAT conversion test may for example be determined by simulated distillation techniques, for example modifications of gas chromatographic "Sim-D", ASTM D-2887-73. The results of such simulations are in reasonable agreement with the results obtained by subjecting larger samples of material to standard laboratory distillation techniques. Conversion is calculated by subtracting from 100 the volume percent (based on fresh feed) of those products heavier than gasoline which remain in the recovered product.

On pages 935–937 of Hougen and Watson, *Chemical Process Principles*, John Wiley & Sons, Inc., N.Y. (1947), the concept of "Activity Factors" is discussed. This concept leads to the use of "relative activity" to compare the effectiveness of an operating catalyst against a standard catalyst. Relative activity measurements facilitate recognition of how the quantity requirements of various catalysts differ from one another. Thus, relative activity is a ratio obtained by dividing the weight of a standard or reference catalyst which is or would be required to produce a given level of conversion, as compared to the weight of an operating catalyst (whether proposed or actually used) which is or would be required to produce the same level of conversion in the same or equivalent feedstock under the same or equivalent conditions. Said ratio of catalyst weights may be expressed as a numerical ratio, but preferably is converted to a percentage basis. The standard catalyst is preferably chosen from among catalysts useful for conducting the present invention, such as for example zeolite fluid cracking catalysts, and is chosen for its ability to produce a predetermined level of conversion in a standard feed under the conditions of temperature, WHSV, catalyst to oil ratio and other conditions set forth in the preceding description of the MAT conversion test and in ASTM D-32 MAT test D-3907-80. Conversion is the volume percentage of feedstock that is converted to 430° F. end point gasoline, lighter products and coke. For standard feed, one may employ the above-mentioned light primary gas oil, or equivalent.

For purposes of conducting relative activity determinations, one may prepare a "standard catalyst curve", a chart or graph of conversion (as above defined) vs. reciprocal WHSV for the standard catalyst and feedstock. A sufficient number of runs is made under ASTM D-3907-80 conditions (as modified above) using standard feedstock at varying levels of WHSV to prepare an accurate "curve" of conversion vs. WHSV for the standard feedstock. This curve should traverse all or substantially all of the various levels of conversion including the range of conversion within which it is expected that the operating catalyst will be tested. From this curve, one may establish a standard WHSV for test comparisons and a standard value of reciprocal WHSV corresponding to that level of conversion which has been chosen to represent 100% relative activity in the standard catalyst. For purposes of the present disclosure the aforementioned reciprocal WHSV and level of conversion are, respectively, 0.0625 and 75%. In testing an operating catalyst of unknown relative activity, one conducts a sufficient number of runs with that catalyst under D-3907-80 conditions (as modified above) to establish the level of conversion which is or would be produced with the operating catalyst at standard reciprocal WHSV. Then, using the above-mentioned standard catalyst curve, one establishes a hypothetical reciprocal WHSV constituting the reciprocal WHSV which would have been required, using the standard catalyst, to obtain the same level of conversion which was or would be exhibited, by the operating catalyst at standard WHSV. The relative activity may then be calculated by dividing the hypothetical reciprocal WHSV by the reciprocal standard WHSV, which is 1/16, or 0.0625. The result is relative activity expressed in terms of a decimal fraction, which may then be multiplied by 100 to convert to percent relative activity. In applying the results of this determination, a relative activity of 0.5, or 50%, means that it would take twice the amount of the operating catalyst to give the same conversion as the standard catalyst, i.e., the production catalyst is 50% as active as the reference catalyst.

The catalyst may be introduced into the process in its virgin form or, as previously indicated, in other than virgin form; e.g. one may use equilibrium catalyst withdrawn from another unit, such as catalyst that has been employed in the cracking of a different feed. Whether characterized on the basis of MAT conversion activity or relative activity, the preferred catalysts may be described on the basis of their activity "as introduced" into the process of the present invention, or on the basis of their "as withdrawn" or equilibrium activity in the process of the present invention, or on both of these bases. A preferred activity level of virgin and non-virgin catalyst "as introduced" into the process of the present invention is at least about 60% by MAT conversion, and preferably at least about 20%, more preferably at least about 40% and still more preferably at least about 60% in terms of relative activity. However, it will be appreciated that, particularly in the case of non-virgin catalysts supplied at high addition rates, lower activity levels may be acceptable. An acceptable "as withdrawn" or equilibrium activity level of catalyst which has been used in the process of the present invention is at least about 20% or more, but about 40% or more and preferably about 60% or more are preferred values on a relative activity basis, and an activity level of 60% or more on a MAT conversion basis is also contemplated. More preferably, it is desired to employ a catalyst which will, under the conditions of use in the unit, establish an equilibrium activity at or above the indicated level. The catalyst activities are determined with catalyst having less than 0.01 coke, e.g. regenerated catalyst.

One may employ any hydrocarbon cracking catalyst having the above indicated conversion capabilities. A particularly preferred class of catalysts includes those which have pore structures into which molecules of feed material may enter for adsorption and/or for contact with active catalytic sites within or adjacent the pores. Various types of catalysts are available within this classification, including for example the layered silicates, e.g. smectites. Although the most widely available catalysts within this classification are the well-known zeolite-containing catalysts, non-zeolite catalysts are also contemplated.

The preferred zeolite-containing catalysts may include any zeolite, whether natural, semi-synthetic or synthetic, alone or in admixture with other materials which do not significantly impair the suitability of the catalyst, provided the resultant catalyst has the activity and pore structure referred to above. For example, if the virgin catalyst is a mixture, it may include the zeolite component associated with or dispersed in a porous refractory inorganic oxide carrier. In such case the catalyst may for example contain about 1% to about 60%, more preferably about 15 to about 50%, and most typically about 20 to about 45% by weight, based on the total weight of catalyst (water free basis) of the zeolite, the balance of the catalyst being the porous refractory inorganic oxide alone or in combination with any of the known adjuvants for promoting or suppressing various desired and undesired reactions. For a general explanation of the genus of zeolite, molecular sieve catalysts useful in the invention, attention is drawn to the disclosures of the articles entitled "Refinery Catalysts Are a Fluid Business" and "Making Cat Crackets Work on Varied Diet," appearing respectively in the July 26, 1978 and September 13, 1978 issues of Chemical Week magazine. The descriptions of the aforementioned publications are incorporated herein by reference.

For the most part, the zeolite components of the zeolite-containing catalysts will be those which are known to be useful in FCC cracking processes. In general, these are crystalline aluminosilicates, typically made up of tetra coordinated aluminum atoms associated through oxygen atoms with adjacent silicon atoms in the crystal structure. However, the term "zeolite" as used in this disclosure contemplates not only aluminosilicates, but also substances in which the aluminum has been partly or wholly replaced, such as for instance by gallium and/or other metal atoms, and further includes substances in which all or part of the silicon has been replaced, such as for instance by germanium. Titanium and zirconium substitution may also be practiced.

Most zeolites are prepared or occur naturally in the sodium form, so that sodium cations are associated with the electronegative sites in the crystal structure. The sodium cations tend to make zeolites inactive and much less stable when exposed to hydrocarbon conversion conditions, particularly high temperatures. Accordingly, the zeolite may be ion exchanged, and where the zeolite is a component of a catalyst composition, such ion exchanging may occur before or after incorporation of the zeolite as a component of the composition. Suitable cations for replacement of sodium in the zeolite crystal structure include ammonium (decomposable to hydrogen), hydrogen, rare earth metals, alkaline earth metals, etc. Various suitable ion exchange procedures and cations which may be exchanged into the zeolite crystal structure are well known to those skilled in the art.

Examples of the naturally occurring crystalline aluminosilicate zeolites which may be used as or included in the catalyst for the present invention are faujasite, mordenite, clinoptilote, chabazite, analcite, crionite, as well as levynite, dachiardite, paulingite, noselite, ferriorite, heulandite, scolccite, stibite, harmotome, phillipsite, brewsterite, flarite, datolite, gmelinite, caumnite, leucite, lazurite, scaplite, mesolite, ptolite, nephline, matrolite, offretite and sodalite.

Examples of the synthetic crystalline aluminosilicate zeolites which are useful as or in the catalyst for carrying out the present invention are Zeolite X, U.S. Pat. No. 2,882,244; Zeolite Y, U.S. Pat. No. 3,130,007; and Zeolite A, U.S. Pat. No. 2,882,243; as well as Zeolite B, U.S. Pat. No. 3,008,803; Zeolite D, Canadian Pat. No. 661,981; Zeolite E, Canadian Pat. No. 614,495; Zeolite F, U.S. Pat. No. 2,996,358; Zeolite H, U.S. Pat. No. 3,010,789; Zeolite J, U.S. Pat. No. 3,011,869; Zeolite L, Belgian Pat. No. 575,177; Zeolite M, U.S. Pat. No. 2,995,423; Zeolite O, U.S. Pat. No. 3,140,252; Zeolite Q, U.S. Pat. No. 2,991,151; Zeolite S, U.S. Pat. No. 3,054,657; Zeolite T, U.S. Pat. No. 2,950,952; Zeolite W, U.S. Pat. No. 3,012,853; Zeolite Z, Canadian Pat. No. 614,495; and Zeolite Omega, Canadian Pat. No. 817,915. Also, ZK-4HJ, alpha, beta and ZSM-type zeolites are useful. Moreover, the zeolites described in U.S. Pat. Nos. 3,140,249; 3,140,253; 3,944,482; and 4,137,151 are also useful, the disclosures of said patents being incorporated herein by reference.

The crystalline aluminosilicate zeolites having a faujasite-type crystal structure are particularly preferred for use in the present invention. This includes particularly natural faujasite and Zeolite X and Zeolite Y.

The crystalline aluminosilicate zeolites, such as synthetic faujasite, will under normal conditions crystallize as regularly shaped, discrete particles of about one to about ten microns in size, and, accordingly, this is the size range frequently found in commercial catalysts which can be used in the invention. Preferably, the particle size of the zeolites is from about 0.1 to about 10 microns and more preferably is from about 0.1 to about 2 microns or less. For example, zeolites prepared in situ from calcined kaolin may be characterized by even smaller crystallites. Crystalline zeolites exhibit both an interior and exterior surface area, the latter being defined as "portal" surface area, with the largest portion of the total surface area being internal. By portal surface area, we refer to the outer surface of the zeolite crystal through which reactants are considered to pass in order to convert to lower boiling products. Blockages of the internal channels by, for example, coke formation, blockages of entrance to the internal channels by deposition of coke in the portal surface area, and contamination by metals poisoning, will greatly reduce the total zeolite surface area. Therefore, to minimize the effect of contamination and pore blockage, crystals larger than the normal size cited above are preferably not used in the catalysts of this invention.

Commercial zeolite-containing catalysts are available with carriers containing a variety of metal oxides and combination thereof, include for example silica, alumina, magnesia, and mixtures thereof and mixtures of such oxides with clays as e.g. described in U.S. Pat. No. 3,034,948. One may for example select any of the zeolite-containing molecular sieve fluid cracking catalysts which are suitable for production of gasoline from vacuum gas oils. However, certain advantages may be attained by judicious selection of catalysts having marked resistance to metals. A metal resistant zeolite catalyst is, for instance described in U.S. Pat. No. 3,944,482, in which the catalyst contains 1-40 weight percent of a rare earth-exchanged zeolite, the balance being a refractory metal oxide having specified pore volume and size distribution. Other catalysts described as "metals-tolerant" are described in the abovementioned Cimbala, et al., article.

In general, it is preferred to employ catalysts having an overall particle size in the range of about 5 to about 160, more preferably about 40 to about 120, and most preferably about 40 to about 80 microns. For example, a useful catalyst may have a skeletal density of about 150 pounds per cubic foot and an average particle size of about 60–70 microns, with less than 10% of the particles having a size less than about 40 microns and less than 80% having a size less than about 50–60 microns.

Although a wide variety of other catalysts, including both zeolite-containing and non-zeolite-containing may be employed in the practice of the invention the following are examples of commercially available catalysts which may be employed in practicing the invention:

TABLE I

|  | Specific Surface m²/g | Weight Percent | | | | | |
|---|---|---|---|---|---|---|---|
|  |  | Zeolite Content | $Al_2O_3$ | $SiO_2$ | $Na_2O$ | $Fe_2O$ | $TiO_2$ |
| AGZ-290 | 300 | 11.0 | 29.5 | 59.0 | 0.40 | 0.11 | 0.59 |
| GRZ-1 | 162 | 14.0 | 23.4 | 69.0 | 0.10 | 0.4 | 0.9 |
| CCZ-220 | 129 | 11.0 | 34.6 | 60.0 | 0.60 | 0.57 | 1.9 |
| Super DX | 155 | 13.0 | 31.0 | 65.0 | 0.80 | 0.57 | 1.6 |
| F-87 | 240 | 10.0 | 44.0 | 50.0 | 0.80 | 0.70 | 1.6 |
| FOX-90 | 240 | 8.0 | 44.0 | 52.0 | 0.65 | 0.65 | 1.1 |
| HFZ 20 | 310 | 20.0 | 59.0 | 40.0 | 0.47 | 0.54 | 2.75 |
| HEZ 55 | 210 | 19.0 | 59.0 | 35.2 | 0.60 | 0.60 | 2.5 |

The AGZ-290, GRZ-1, CCZ-220 and Super DX catalysts referred to above are products of W. R. Grace and Co. F-87 and FOX-90 are products of Filtrol, while HFZ-20 and HEZ-55 are products of Engelhard/Houdry. The above are properties of virgin catalyst and, except in the case of zeolite content, are adjusted to a water-free basis, i.e. based on material ignited at 1750°

F. The zeolite content is derived by comparison of the X-ray intensities of a catalyst sample and of a standard material composed of high purity sodium Y zeolite in accordance with draft #6, dated Jan. 9, 1978, of proposed ASTM Standard Method entitled "Determination of the Faujasite Content of a catalyst."

Among the above-mentioned commercially available catalysts, the Super D family and especially a catalyst designated GRZ-1 are particularly preferred. For example, Super DX has given particularly good results with Arabian light crude. The GRZ-1, although substantially more expensive than the Super DX at present, appears somewhat more metals-tolerant.

Although not yet commercially available, it is believed that the best catalysts for carrying out the present invention are those which are characterized by matrices with feeder pores having large minimum diameters and large mouths to facilitate diffusion of high molecular weight molecules through the matrix to the portal surface area of molecular sieve particles within the matrix. Such matrices preferably also have a relatively large pore volume in order to soak up unvaporized portions of the carbo-metallic oil feed. Thus, significant numbers of liquid hydrocarbon molecules can diffuse to active catalytic sites both in the matrix and in sieve particles on the surface of the matrix. In general, it is preferred to employ catalysts having a total pore volume greater than 0.2 cc/gm, preferably at least 0.4 cc/gm, more preferably at least 0.6 cc/gm and most preferably in the range of 0.7 to 1.0 cc/gm, and with matrices wherein at least 0.1 cc/gm, and preferably at least 0.2 cc/gm, of said total pore volume is comprised of feeder pores having diameters in the range of about 400 to about 6000 angstrom units, more preferably in the range of about 1000 to about 6000 angstrom units. These catalysts and the method for making the same are described more fully in copending International Application Ser. No. PCT/US81/00492 filed in the U.S. Receiving Office on Apr. 10, 1981, in the names of Ahsland Oil, Inc., et al., and entitled "Large Pore Catalysts for Heavy Hydrocarbon Conversion," the entire disclosure of said application being incorporated herein by reference.

Catalysts for carrying out the present invention may also employ other metal additives for controlling the adverse effects of vanadium as described in PCT International Application Ser. No. PCT/US81/00356 filed in the U.S. Receiving Office on Mar. 19, 1981, in the names of Ashland Oil, Inc., et al., and entitled "Immobilization of Vanadia Deposited on Catalytic Materials During Carbo-Metallic Oil Conversion." The manner in which these and other metal additives are believed to interact with vanadium is set forth in said PCT International Application, the entire disclosure of which is incorporated herein by reference. Certain of the additive metals compounds disclosed in this referenced PCT application, particularly those of titanium and zirconium, will also passivate nickel, iron and copper. The passivating mechanism of titanium and zirconium on nickel, iron and copper is believed to be similar to that of aluminum and silicon, namely, an oxide and/or spinel coating may be formed. Where the additive is introduced directly into the conversion process, that is into the riser, into the regenerator or into any intermediate components, the additive is preferably an organo-metallic compound of titanium or zirconium soluble in the hydrocarbon feed or in a hydrocarbon solvent miscible with the feed. Examples of preferred organo-metallic compounds of these metals are tetraisopropyl-titanate, Ti $(C_3H_7O)_4$, available as TYZOR from the Du Pont Company; zirconium isopropoxide, Zr $(C_3H_7O)_4$; and zirconium 2,4-pentanedionate-Zr $(C_5H_7O_2)_4$. These organo-metallics are only a partial example of the various types available and others would include alcoholates, esters, phenolates, naphthenates, carboxylates, dienyl sandwich compounds, and the like. Other preferred process additives include titanium tetrachloride, zirconium tetrachloride and zirconium acetate, and the water soluble inorganic salts of these metals, including the sulfates, nitrates and chlorides, which are relatively inexpensive.

Because the atomic weight of zirconium differs relative to the atomic weights of nickel and vanadium, while that of titanium is about the same, a 1:1 atomic ratio is equivalent to about a 1.0 weight ratio of titanium to nickel plus vanadium, and to about a 2.0 weight ratio of zirconium to nickel plus vanadium. Multiples of the 1:1 atomic ratio require the same multiple of the weight ratio. For example, a 2:1 atomic ratio requires about a 2.0 titanium weight ratio and about a 4.0 zirconium weight ratio.

Additives may be introduced into the riser, the regenerator or other conversion system components to passivate the non-selective catalytic activity of heavy metals deposited on the conversion catalyst. Preferred additives for practicing the present invention include those disclosed in U.S. Pat. No. 4,454,025 in the name of William P. Hettinger, Jr., and entitled PASSIVATING HEAVY METALS IN CARBO-METALLIC OIL CONVERSION, the entire disclosure of said U.S. application being incorporated herein by reference.

A particularly preferred catalyst also includes vanadium traps as disclosed in U.S. patent application Ser. No. 252,967 filed Apr. 10, 1981, in the names of William P. Hettinger, Jr., et al., and entitled "Trapping of Metals Deposited on Catalytic Materials During Carbo-Metallic Oil Conversion." It is also preferred to control the valence state of vanadium accumulations on the catalyst during regeneration as disclosed in the U.S. patent application Ser. No. 255,398 entitled "Immobilization of Vanadium Deposited on Catalytic Materials During Carbo-Metallic Oil Conversion" filed in the names of William P. Hettinger, Jr., et al., on Apr. 20, 1981, as well as the continuation-in-part of the same application, U.S. Pat. No. 4,377,470. The entire disclosures of said U.S. Patent Applications are incorporated herein by reference.

A catalyst which is particularly useful in processes for converting carbo-metallic oils containing high concentrations of high boiling constituents is disclosed in U.S. patent application Ser. No. 4,407,714 in the names of William P. Hettinger et al., and entitled "Process for Cracking High Boiling Hydrocarbons Using High Pore Volume, Low Density Catalyst." The entire disclosure of said application is hereby incorporated by reference.

It is considered an advantage that the process of the present invention can be conducted in the substantial absence of tin and/or antimony or at least in the presence of a catalyst which is substantially free of either or both of these metals.

SUPPLEMENTAL MATERIALS ADDED TO REACTOR

The process of the present invention may be operated with the above described carbo-metallic oil and catalyst as substantially the sole materials charged to the reaction zone, although charging of additional materials is not excluded. The charging of recycled oil to the reaction zone has already been mentioned. As described in greater detail below, still other materials fulfilling a variety of functions may also be charged. In such case, the carbo-metallic oil and catalyst usually represent the major proportion by weight of the total of all materials charged to the reaction zone.

Certain of the additional materials which may be used perform functions which offer significant advantages over the process as performed with only the carbo-metallic oil and catalyst. Among these functions are: controlling the effects of heavy metals and other catalyst contaminants; enhancing catalyst activity; absorbing excess heat in the catalyst as received from the regenerator; disposal of pollutants or conversion thereof to a form or forms in which they may be more readily separated from products and/or disposed of; controlling catalyst temperature; diluting the carbo-metallic oil vapors to reduce their partial pressure and increase the yield of desired products; adjusting feed/catalyst contact time; donation of hydrogen to a hydrogen deficient carbo-metallic oil feedstock for example as disclosed in U.S. Pat. No. 4,376,038, entitled "Use of Naphtha in Carbo-Metallic Oil Conversion," filed in the name of George D. Myers on Mar. 23, 1981, which application is incorporated herein by reference; assisting in the dispersion of the feed; and possibly also distillation of products. Certain of the metals in the heavy metals accumulation on the catalyst are more active in promoting undesired reactions when they are in the form of elemental metal than they are when in the oxidized form produced by contact with oxygen in the catalyst regenerator. However, the time of contact between catalyst and vapors of feed and product in past conventional catalytic cracking was sufficient so that hydrogen released in the cracking reaction was able to reconvert a significant portion of the less harmful oxides back to the more harmful elemental heavy metals. One can take advantage of this situation through the introduction of additional materials which are in gaseous (including vaporous) form in the reaction zone in admixture with the catalyst and vapors of feed and products. The increased volume of material in the reaction zone resulting from the presence of such additional materials tends to increase the velocity of flow through the reaction zone with a corresponding decrease in the residence time of the catalyst and oxidized heavy metals borne thereby. Because of this reduced residence time, there is less opportunity for reduction of the oxidized heavy metals to elemental form and therefore less of the harmful elemental metals are available for contacting the feed and products.

Added materials may be introduced into the process in any suitable fashion, some examples of which follow. For instance, they may be admixed with the carbo-metallic oil feedstock prior to contact of the latter with the catalyst. Alternatively, the added materials may, if desired, be admixed with the catalyst prior to contact of the latter with the feedstock. Separate portions of the added materials may be separately admixed with both catalyst and carbo-metallic oil. Moreover, the feedstock, catalyst and additional materials may, if desired, be brought together substantially simultaneously. A portion of the added materials may be mixed with catalyst and/or carbo-metallic oil in any of the above-described ways, while additional portions are subsequently brought into admixture. For example, a portion of the added materials may be added to the carbo-metallic oil and/or to the catalyst before they reach the reaction zone, while another portion of the added materials is introduced directly into the reaction zone. The added materials may be introduced at a plurality of spaced locations in the reaction zone or along the length thereof, if elongated.

The amount of additional materials which may be present in the feed, catalyst or reaction zone for carrying out the above functions, and others, may be varied as desired; but said amount will preferably be sufficient to substantially heat balance the process. These materials may for example be introduced into the reaction zone in a weight ratio relative to feed of up to about 0.4, preferably in the range of about 0.02 to about 0.4, more preferably about 0.03 to about 0.3 and most preferably about 0.05 to about 0.25.

For example, many or all of the above desirable functions may be attained by introducing $H_2O$ to the reaction zone in the form of steam or of liquid water or a combination thereof in a weight ratio relative to feed in the range of about 0.04 or more, or more preferably about 0.05 to about 0.1 or more. Without wishing to be bound by any theory, it appears that the use of $H_2O$ tends to inhibit reduction of catalyst-borne oxides, sulfites and sulfides to the free metallic form which is believed to promote condensation-dehydrogenation with consequent promotion of coke and hydrogen yield and accompanying loss of product. Moreover, $H_2O$ may also, to some extent, reduce deposition of metals onto the catalyst surface. There may also be some tendency to desorb nitrogen-containing and other heavy contaminant-containing molecules from the surface of the catalyst particles, or at least some tendency to inhibit their absorption by the catalyst. It is also believed that added $H_2O$ tends to increase the acidity of the catalyst by Bronsted acid formation which in turn enhances the activity of the catalyst. Assuming the $H_2O$ as supplied is cooler than the regenerated catalyst and/or the temperature of the reaction zone, the sensible heat involved in raising the temperature of the $H_2O$ upon contacting the catalyst in the reaction zone or elsewhere can absorb excess heat from the catalyst. Where the $H_2O$ is or includes recycled water that contains for example about 500 to about 5000 ppm of $H_2S$ dissolved therein, a number of additional advantages may accrue. The ecologically unattractive $H_2S$ need not be vented to the atmosphere, the recycled water does not require further treatment to remove $H_2S$ and the $H_2S$ may be of assistance in reducing coking of the catalyst by passivation of the heavy metals, i.e., by conversion thereof to the sulfide form which has a lesser tendency than the free metals to enhance coke and hydrogen production. In the reaction zone, the presence of $H_2O$ can dilute the carbo-metallic oil vapors, thus reducing their partial pressure and tending to increase the yield of the desired products. It has been reported that $H_2O$ is useful in combination with other materials in generating hydrogen during cracking; thus it may be able to act as a hydrogen donor for hydrogen deficient carbo-metallic oil feedstocks. The $H_2O$ may also serve certain purely mechanical functions such as: assisting in the atomizing or dispersion of the feed; competing with high molecular weight molecules for adsorption on the surface of the catalyst, thus interrupting coke formation; steam distillation of vaporizable product from unvaporized feed material; and disengagement of product from catalyst upon conclusion of the cracking reaction. It is particularly preferred to bring together $H_2O$, catalyst and carbo-metallic oil substantially simultaneously. For example, one may admix H₂O and feedstock in an atomizing nozzle and immediately direct the resultant spray into contact with the catalyst at the downstream end of the reaction zone.

The addition of steam to the reaction zone is frequently mentioned in the literature of fluid catalytic cracking. Addition of liquid water to the feed is discussed relatively infrequently, compared to the introduction of steam directly into the reaction zone. However, in accordance with the present invention it is particularly preferred that liquid water be brought into intimate admixture with the carbo-metallic oil in a weight ratio of about 0.04 to about 0.25 at or prior to the time of introduction of the oil into the reaction zone, whereby the water (e.g., in the form of liquid water or in the form of steam produced by vaporization of liquid water in contact with the oil) enters the reaction zone as part of the flow of feedstock which enters such zone. Although not wishing to be bound by any theory, it is believed that the foregoing is advantageous in promoting dispersion of the feedstock. Also, the heat of vaporization of the water, which heat is absorbed from the catalyst, from the feedstock, or from both causes the water to be a more efficient heat sink than steam alone. Preferably the weight ratio of liquid water to feed is about 0.04 to about 0.2 more preferably about 0.05 to about 0.15.

Of course, the liquid water may be introduced into the process in the above-described manner or in other ways, and in either event the introduction of liquid water may be accompanied by the introduction of additional amounts of water as steam into the same or different portions of the reaction zone or into the catalyst and/or feedstock. For example, the amount of additional steam may be in a weight ratio relative to feed in the range of about 0.01 to about 0.25, with the weight ratio of tatal H₂O (as steam and liquid water) to feedstock being about 0.3 or less. The charging weight ratio of liquid water relative to steam in such combined use of liquid water and steam may for example range from about 15 which is presently preferred, to about 0.2. Such ratio may be maintained at a predetermined level within such range or varied as necessary or desired to adjust or maintain heat balance.

Other materials may be added to the reaction zone to perform one or more of the above-described functions. For example, the dehydrogenation-condensation activity of heavy metals may be inhibited by introducing hydrogen sulfide gas into the reaction zone. Hydrogen may be made available for hydrogen deficient carbo-metallic oil feedstock by introducing into the reaction zone either a conventional hydrogen donor diluent such as a heavy naphtha or relatively low molecular weight carbon-hydrocarbon fragment contributors, including for example: light paraffins; low molecular weight alcohols and other compounds which permit or favor intermolecular hydrogen transfer; and compounds that chemically combine to generate hydrogen in the reaction zone such as by reaction of carbon monoxide with water, or with alcohols, or with olefins, or with other materials or mixtures of the foregoing.

All of the above-mentioned additional materials (including water), along or in conjunction with each other or in conjunction with other materials, such as nitrogen or other inert gases, light hydrocarbons, and others, may perform any of the above-described functions for which they are suitable, including without limitation, acting as diluents to reduce feed partial pressure and/or as heat sinks to absorb excess heat present in the catalyst as received from the regeneration step. The foregoing is a discussion of some of the functions which can be performed by materials other than catalyst and carbo-metallic oil feedstock introduced into the reaction zone, and it should be understood that other materials may be added or other functions performed without departing from the spirit of the invention.

The invention may be practiced in a wide variety of apparatus. However, the preferred apparatus includes means for rapidly vaporizing as much feed as possible and efficiently admixing feed and catalyst (although not necessarily in that order), for causing the resultant mixture to flow as a dilute suspension in a progressive flow mode, and for separating the catalyst from cracked products and any uncracked or only partially cracked feed at the end of a predetermined residence time or times, it being preferred that all or at least a substantial portion of the product should be abruptly separated from at least a portion of the catalyst.

For example, the apparatus may include, along its elongated reaction chamber, one or more points for introduction of carbo-metallic feed, one or more points for introduction of catalyst, one or more points for introduction of additional material, one or more points for withdrawal of products and one or more points for withdrawal of catalyst.

The means for introducing feed, catalyst and other material may range from open pipes to sophisticated jets or spray nozzles, it being preferred to use means capable of breaking up the liquid feed into fine droplets. Preferably, the catalyst, liquid water (when used) and fresh feed are brought together in an apparatus similar to that disclosed in U.S. patent application Ser. No. 969,601 of George D. Myers, et al, filed Dec. 14, 1978 for "Method for Cracking Residual Oils" the entire disclosure of which is hereby incorporated herein by reference. A particularly preferred embodiment for introducing liquid water and oil into the riser is described in U.S. Pat. No. 4,405,445 filed Aug. 24, 1981 in the name of Stephen M. Kovach et al for "Homogenation of Water and Reduced Crude," and the entire disclosure of said U.S. application is incorporated herein by reference. As described in that application the liquid water and carbo-metallic oil, prior to their introduction into the riser, are caused to pass through a propeller, apertured disc, or any appropriate high shear agitating means for forming a "homogenized mixture" containing finely divided droplets of oil and/or wter with oil and/or water present as a continuous phase.

REACTOR

It is preferred that the reaction chamber, or at least the major portion thereof, be more nearly vertical than horizontal and have a length to diameter ratio of at least about 10, more preferably about 20 or 25 or more. Use of a vertical riser type reactor is preferred. If tubular, the reactor can be of uniform diameter throughout or may be provided with a continuous or step-wise increase in diameter along the reaction path to maintain or vary the velocity along the flow path.

In general, the charging means (for catalyst and feed) and the reactor configuration are such as to provide a relatively high velocity of flow and dilute suspension of catalyst. For example, the vapor or catalyst velocity in the riser will be usually at least about 25 and more typically at least about 35 feet per second. This velocity may range up to about 55 or about 75 feet or about 100 feet per second or higher. The vapor velocity at the top of the reactor may be higher than that at the bottom and may for example be about 80 feet per second at the top and about 40 feet per second at the bottom. The velocity capabilities of the reactor will in general be sufficient to prevent substantial build-up of catalyst bed in the bottom or other portions of the riser, whereby the catalyst loading in the riser can be maintained below 4 or 5 pounds, as for example about 0.5 pounds, and below about 2 pounds, as for example 0.8 pounds, per cubic foot, respectively, at the upstream (e.g., bottom) and downstream (e.g., top) ends of the riser.

The progressive flow mode involves, for example, flowing of catalyst, feed and products as a stream in a positively controlled and maintained direction established by the elongated nature of the reaction zone. This is not to suggest however that there must be strictly linear flow. As is well known, turbulent flow and "slippage" of catalyst may occur to some extent especially in certain ranges of vapor velocity and some catalyst loadings, although it has been reported advisable to employ sufficiently low catalyst loadings to restrict slippage and back-mixing.

Most preferably the reactor is one which abruptly separates a substantial portion or all of the vaporized cracked products from the catalyst at one or more points along the riser, and preferably separates substantially all of the vaporized cracked products from the catalyst at the downstream end of the riser. A preferred type of reactor embodies ballistic separation of the catalyst and products; that is, catalyst is projected in a direction established by the riser tube, and is caused to continue in motion in the general direction so established, while the products, having lesser momentum, are caused to make an abrupt change of direction, resulting in an abrupt, substantially instantaneous separation of product from catalyst. In a preferred embodiment referred to as a vented riser, the riser tube is provided with a substantially unobstructed discharge opening at its downstream end for discharge of catalyst. An exit port near the tube outlet adjacent the downstream end receives the products. The discharge opening communicates with a catalyst flow path which extends to the usual stripper and regenerator, while the exit port communicates with a catalyst flow path which extends to the usual stripper and regenerator, while the exit port communicates with a product flow path which is substantially or entirely separated from the catalyst flow path and leads to separation means for separating the products from the relatively small portion of catalyst, if any, which manages to gain entry to the product exit port.

A particularly preferred embodiment for separating catalyst and product is described in U.S. Pat. No. 4,390,503 filed May 13, 1981 in the names of Dwight Barger et al., for "Carbo-Metallic Oil Conversion With Ballistic Separation" and the entire disclosure of that application is hereby incorporated by reference. The ballistic separation step disclosed therein includes diversion of the product vapors upon discharge from the riser tube; that is, the product vapors make a turn or change of direction of about 45°, 90°, 105° or more at the riser tube outlet. This may be accomplished for example by providing an annular cup-like member surrounding the riser tube at its upper end. The ratio of cross-sectional area of the annulus of the cup-like member relative to the cross-section area of the riser outlet is preferably low i.e., less than 1 and preferably less than about 0.6. Preferably the lip of the cup is slightly upstream of, or below the downstream end of the top of the riser tube, and the cup is preferably concentric with the riser tube. By means of a product vapor line communicating with the interior of the cup but not the interior of the riser tube, having its inlet positioned within the cup interior in a direction upstream of the riser tube outlet, product vapors emanating from the riser tube and entering the cup by diversion of direction are transported away from the cup to auxiliary catalyst and product separation equipment downstream of the cup. Such an arrangement can produce a high degree of completion of the separation of catalyst from product vapors at the vented riser tube outlet, so that the required amount of auxiliary catalyst separation equipment such as cyclones is greatly reduced, with consequent large savings in capital investment and operating cost.

Preferred conditions for operation of the process are described below. Among these are feed, catalyst and reaction temperatures, reaction and feed pressures, residence time and levels of conversion, coke production and coke laydown on catalyst.

In conventional FCC operations with VGO, the feedstock is customarily preheated, often to temperatures significantly higher than are required to make the feed sufficiently fluid for pumping and for introduction into the reactor. For example, preheat temperatures as high as about 700° or 800° F. have been reported. But in our process as presently practiced it is preferred to restrict preheating of the feed, so that the feed is capable of absorbing a larger amount of heat from the catalyst while the catalyst raises the feed to conversion temperature, at the same time minimizing utilization of external fuels to heat the feedstock.

Thus, where the nature of the feedstock permits, it may be fed at ambient temperature. Heavier stocks may be fed at preheat temperatures of up to about 500° F., typically about 200° F. to about 500° F., but higher preheat temperatures are not necessarily excluded.

The catalyst fed to the reactor may vary widely in temperature, for example from about 1100° to about 1600° F., more preferably about 1200° to about 1500° F. and most preferably about 1200° to about 1500° F. and most preferably about 1300° to about 1400° F., with about 1325° to about 1375° F. being considered optimum at present.

As indicated previously, the conversion of the carbo-metallic oil to lower molecular weight products may be conducted at a temperature of about 900° to about 1400° F., measured at the reaction chamber outlet. The reaction temperature as measured at said outlet is more preferably maintained in the range of about 965° to about 1300° F., still more preferably about 975° to about 1150° F. Depending upon the temperature selected and the properties of the feed, all of the feed may or may not vaporize in the riser.

Although the pressure in the reactor may, as indicated above, range from about 10 to about 50 psia, preferred and more preferred pressure ranges are about 15 to about 35 and about 20 to about 35. In general, the partial (or total) pressure of the feed may be in the range of about 3 to about 30, more preferably about 7 to about 25 and most preferably about 10 to about 17 psia. The feed partial pressure may be controlled or suppressed by the introduction of gaseous (including vaporous) materials into the reactor, such as for instance the steam, water and other additional materials described above. The process has for example been operated with the ratio of feed partial pressure relative to total pressure in the riser in the range of about 0.2 to about 0.8, more typically about 0.3 to about 0.7 and still more typically about 0.4 to about 0.6, with the ratio of added gaseous material (which may include recycled gases and/or steam resulting from introduction of $H_2O$ to the riser in the form of steam and/or liquid water) relative to total pressure in the riser correspondingly ranging from about 0.8 to about 0.2, more typically about 0.7 to about 0.3 and still more typically about 0.6 to about 0.4. In the illustrative operations just described, the ratio of the partial pressure of the added gaseous material relative to the partial pressure of the feed has been in the range of about 0.25 to about 4.0, more typically about 0.4 to about 2.3 and still more typically about 0.7 to about 1.7. Although the residence time of feed and product vapors in the riser may be in the range of about 0.5 to about 10 seconds, as described above, preferred and more preferred values are about 0.5 to about 6 and about 1 to about 4 seconds, with about 1.5 to about 3.0 seconds currently being considered optimum, For example, the process has been operated with a riser vapor residence time of about 2.5 seconds or less by introduction of copious amounts of gaseous materials into the riser, such amounts being sufficient to provide for example a partial pressure ratio of added gaseous materials relative to hydrocarbon feed of about 0.8 or more. By way of further illustration, the process has been operated with said residence time being about 2 seconds or less, with the aforesaid ratio being in the range of about 1 to about 2. The combination of low feed partial pressure, very low residence time and ballistic separation of products from catalyst are considered especially beneficial for the conversion of carbo-metallic oils. Additional benefits may be obtained in the foregoing combination when there is a substantial partial pressure of added gaseous material, especially $H_2O$ as described above.

Depending upon whether there is slippage between the catalyst and hydrocarbon vapors in the riser, the catalyst riser residence time may or may not be the same as that of the vapors. U.S. Pat. No. 4,374,019 in the names of Stephen M. Kovach et al., for "Process for Cracking High Boiling Hydrocarbons Using High Ratio of Catalyst Residence Time to Vapor Residence Time" discloses a cracking process employing a high slippage ratio, and the disclosure of that application is hereby incorporated by reference. As disclosed therein, the ratio of average catalyst reactor residence time versus vapor reactor residence time, i.e., slippage, may be in the range from about 1.2:1 to about 12:1, more preferably from about 1.5:1 to about 5:1 and most preferably from about 1.8:1 to about 3:1, with about 1 to about 2 currently being considered optimum.

In practice, there will usually be a small amount of slippage, e.g., at least about 1.05 or 1.2. In an operating unit there may for example be a slippage of about 1.1 at the bottom of the riser and about 1.5 at the top.

In certain types of known FCC units, there is a riser which discharges catalyst and product vapors together into an enlarged chamber, usually considered to be part of the reactor, in which the catalyst is disengaged from product and collected. Continued contact of catalyst, uncracked feed (if any) and cracked products in such enlarged chamber results in an overall catalyst feed contact time appreciably exceeding the riser tube residence times of the vapors and catalysts. When practicing the process of the present invention with ballistic separation of catalyst and vapors at the downstream (e.g., upper) extremity of the riser, such as is taught in the above-mentioned Myers, et al., patents, the riser residence time and the catalyst contact time are substantially the same for a major portion of the feed and product vapors. It is considered advantageous if the vapor riser residence time and vapor catalyst contact time are substantially the same for at least about 80%, more preferably at least about 90% and most preferably at least about 95% by volume of the total feed and product vapors passing through the riser. By denying such vapors continued contact with catalyst in a catalyst disengagement and collection chamber one may avoid a tendency toward re-cracking and diminished selectivity.

In general, the combination of catalyst-to-oil ratio, temperatures, pressures and residence times should be such as to effect a substantial conversion of the carbo-metallic oil feedstock. It is an advantage of the process that very high levels of conversion can be attained in a single pass; for example the conversion may be in excess of 50% and may range to about 90% or higher. Preferably, the aforementioned conditions are maintained at levels sufficient to maintain conversion levels in the range of about 60 to about 90% and more preferably about 70 to about 85%. The foregoing conversion levels are calculated by subtracting from 100% the percentage obtained by dividing the liquid volume of fresh feed into 100 times the volume of liquid product boiling at and above 430° (tbp, standard atmospheric pressure).

These substantial levels of conversion may and usually do result in relatively large yields of coke, such as for example about 4 to about 17% by weight based on fresh feed, more commonly about 6 to about 13% and most frequently about 10 to about 13%. The coke yield can more or less quantitatively deposit upon the catalyst. At contemplated catalyst to oil ratios, the resultant coke laydown may be in excess of about 0.3, more commonly in excess of about 0.5 and very frequently in excess of about 1% of coke by weight, based on the weight of moisture free regenerated catalyst. Such coke laydown may range as high as about 2%, or about 3%, or even higher.

STRIPPING SPENT CATALYST

In common with conventional FCC operations on VGO, the present process includes stripping of spent catalyst after disengagement of the catalyst from product vapors. Persons skilled in the art are acquainted with appropriate stripping agents and conditions for stripping spent catalyst, but in some cases the present process may require somewhat more severe conditions than are commonly employed. This may result, for example, from the use of a carbo-metallic oil having constituents which do not volatilize under the conditions prevailing in the reactor, which constituents deposit themselves at least in part on the catalyst. Such adsorbed, unvaporized material can be troublesome from at least two standpoints. First, if the gases (including vapors) used to strip the catalyst can gain admission to a catalyst disengagement or collection chamber connected to the downstream end of the riser, and if there is an accumulation of catalyst in such chamber, vaporization of these unvaporized hydrocarbons in the stripper can be followed by adsorption on the bed of catalyst in the chamber. More particularly, as the catalyst in the stripper is stripped of adsorbed feed material, the resultant feed material vapors pass through the bed of catalyst accumulated in the catalyst collection and/or disengagement chamber and may deposit coke and/or condensed material on the catalyst in said bed. As the catalyst bearing such deposits moves from the bed and into the stripper and from thence to the regenerator, the condensed products can create a demand for more stripping capacity, while the coke can tend to increase regeneration temperatures and/or demand greater regeneration capacity. For the foregoing reasons, it is preferred to prevent or restrict contact between stripping vapors and catalyst accumulations in the catalyst disengagement or collection chamber. This may be done for example by preventing such accumulations from forming, e.g., with the exception of a quantity of catalyst which essentially drops out of circulation and may remain at the bottom of the disengagement and/or collection chamber, the catalyst that is in circulation may be removed from said chamber promptly upon settling to the bottom of the chamber. Also, to minimize regeneration temperatures and demand for regeneration capacity, it may be desirable to employ conditions of time, temperature and atmosphere in the stripper which are sufficient to reduce potentially volatile hydrocarbon material borne by the stripped catalyst to about 10% or less by weight of the total carbon loading on the catalyst. Such stripping may for example include reheating of the catalyst, extensive stripping with steam, the use of gases having a temperature considered higher than normal for FCC/VGO operations, such as for instance flue gas from the regenerator, as well as other refinery stream gases such as hydrotreater off-gas ($H_2S$ containing), hydrogen and others. For example, the stripper may be operated at a temperature of about 350° F. using steam at a pressure of about 150 psig and a weight ratio of steam to catalyst of about 0.002 to about 0.003. On the other hand, the stripper may be operated at a temperature of about 1025° F. or higher.

A preferred method of stripping using flue gases is described in PCT International Application Serial No. PCT/US81/00546 filed in the United States Receiving Office on May 13, 1981 in the names of William E. McKay, Jr., et al., for "Stripping Hydrocarbons From Catalyst With Combustion Gases," and the entire disclosure of such application is hereby incorporated by reference.

REGENERATION OF SPENT CATALYST

Substantial conversion of carbo-metallic oils to lighter products in accordance with the invention tends to produce sufficiently large coke yields and coke laydown on catalyst to require some care in catalyst regeneration. In order to maintain adequate activity in zeolite and non-zeolite catalysts, it is desirable to regenerate the catalyst under conditions of time, temperature and atmosphere sufficient to reduce the percent by weight of carbon remaining on the catalyst to about 0.25% or less, whether the catalyst bears a large heavy metals accumulation or not.

Preferably this weight percentage is about 0.1% or less and more preferably about 0.05% or less, especially with zeolite catalysts. The amounts of coke which must therefore be burned off of the catalysts when processing carbo-metallic oils are usually substantially greater than would be the case when cracking VGO. The term coke when used to describe the present invention, should be understood to include any residual unvaporized feed or cracking product, if any such material is present on the catalyst after stripping.

Regeneration of catalyst, burning away of coke deposited on the catalyst during the conversion of the feed, may be performed at any suitable temperature in the range of about 1100° to about 1600° F., measured at the regenerator catalyst outlet. This temperature is preferably in the range of about 1200° to about 1500° F., more preferably about 1275° to about 1425° F. and optimally about 1325° F. to about 1375° F. The process has been operated, for example with a fluidized regenerator with the temperature of the catalyst dense phase in the range of about 1300° to about 1400° F.

Regeneration is preferably conducted while maintaining the catalyst in one or more fluidized beds in one or more fluidization chambers. Such fluidized bed operations are characterized, for instance, by one or more fluidized dense beds of ebulliating particles having a bed density of, for example, about 25 to about 50 pounds per cubic foot. Fluidization is maintained by passing gases, including combusion supporting gases, through the bed at a sufficient velocity to maintain the particles in a fluidized state but at a velocity which is sufficiently small to prevent substantial entrainment of particles in the gases. For example, the lineal velocity of the fluidizing gases may be in the range of about 0.2 to about 4 feet per second and preferably about 0.2 to about 3 feet per second. The average total residence time of the particles in the one or more beds is substantial, ranging for example from about 5 to about 30, more preferably about 5 to about 20 and still more preferably about 5 to about 10 minutes. From the foregoing, it may be readily seen that the fluidized bed regeneration of the present invention is readily distinguishable from the short-contact, low-density entrainment type regeneration which has been practiced in some FCC operations.

When regenerating catalyst to very low levels of carbon on regenerated catalyst, e.g., about 0.1% or less or about 0.05% or less, based on the weight of regenerated catalyst, it is acceptable to burn off at least about the last 10% or at least about the last 5% by weight of coke (based on the total weight of coke on the catalyst immediately prior to regeneration) in contact with combustion producing gases containing excess oxygen. In this connection it is contemplated that some selected portion of the coke, ranging from all of the coke down to about the last 5 or 10% by weight, can be burned with excess oxygen. By excess oxygen is meant an amount in excess of the stoichiometric requirement for burning all of the hydrogen to water, all of the carbon to carbon dioxide and all of the other combustible components, if any, which are present in the above-mentioned selected portion of the coke immediately prior to regeneration, to their highest stable state of oxidation under the regenerator conditions. The gaseous products of combustion conducted in the presence of excess oxygen will normally include an appreciable amount of free oxygen. Such free oxygen, unless removed from the byproduct gases or converted to some other form by a means or process other than regeneration, will normally manifest itself as free oxygen in the flue gas from the regenerator unit. In order to provide sufficient driving force to complete the combustion of the coke with excess oxygen, the amount of free oxygen will normally be not merely appreciable but substantial, i.e., there will be a concentration of at least about 2 mole percent of free oxygen in the total regeneration flue gas recovered from the entire, completed regneration operation. While such technique is effective in attaining the desired low levels of carbon on regenerated catalyst, it has its limitations and difficulties as will become apparent from the discussion below.

Heat released by combustion of coke in the regenerator is absorbed by the catalyst and can be readily retained thereby until the regenerated catalyst is brought into contact with fresh feed. When processing carbo-metallic oils to the relatively high levels of conversion involved in the present invention, the amount of regenerator heat which is transmitted to fresh feed by way of recycling regenerated catalyst can substantially exceed the level of heat input which is appropriate in the riser for heating and vaporizing the feed and other materials, for supplying endothermic heat of reaction for cracking, for making up the heat losses of the unit and so forth. Thus, in accordance with the invention, the amount of regenerator heat transmitted to fresh feed may be controlled, or restricted where necessary, within certain approximate ranges. The amount of heat so transmitted may for example be in the range of about 500 to about 1200, more particularly about 600 to about 900, and more particularly about 650 to about 850 BTU's per pound of fresh feed. The aforesaid ranges refer to the combined heat, in BTUs per pound of fresh feed, which is transmitted by the catalyst to the feed and reaction products (between the contacting of feed with the catalyst and the separation of product from catalyst) for supplying the heat of reaction (e.g., for cracking) and the difference in enthalpy between the products and the fresh feed. Not included in the foregoing are the heat made available in the reactor by the adsorption of coke on the catalyst, nor the heat consumed by heating, vaporizing or reacting recycle streams and such added materials as water, steam, naphtha and other hydrogen donors, flue gases and inert gases, or by radiation and other losses.

One or a combination of techniques may be utilized in this invention for controlling or restricting the amount of regeneration heat transmitted via catalyst to fresh feed. For example, one may add a combustion modifier to the cracking catalyst in order to reduce the temperature of combustion of coke to carbon dioxide and/or carbon monoxide in the regenerator. Moreover, one may remove heat from the catalyst through heat exchange means, including for example, heat exchangers (e.g., steam coils) built into the regenerator itself, whereby one may extract heat from the catalyst during regeneration. Heat exchangers can be built into catalyst transfer lines, such as for instance the catalyst return line from the regenerator to the reactor, whereby heat may be removed from the catalyst after it is regenerated. The amount of heat imparted to the catalyst in the regenerator may be restricted by reducing the amount of insulation on the regenerator to permit some heat loss to the surrounding atmosphere, especially if feeds of exceedingly high coking potential are planned for processing; in general, such loss of heat to the atmosphere is considered economically less desirable than certain of the other alternatives set forth herein. One may also inject cooling fluids into portions of the regenerator other than those occupied by the dense bed, for example water and/or stream, whereby the amount of inert gas available in the regenerator for heat absorption and removal is increased. U.S. Pat. No. 4,417,975 in the names of George D. Myers et al., for "Addition of Water to Regeneration Air" describes one method of heat control by adding water to a regenerator, and the entire disclosure of said application is hereby incorporated by reference.

Another suitable and preferred technique for controlling or restricting the heat transmitted to fresh feed via recycled regenerated catalyst involves maintaining a specified ratio between the carbon dioxide and carbon monoxide formed in the regenerator while such gases are in heat exchange contact or relationship with catalyst undergoing regeneration. In general, all or a major portion by weight of the coke present on the catalyst immediately prior to regeneration is removed in at least one combustion zone in which the aforesaid ratio is controlled as described below. More particularly, at least the major portion more preferably at least about 65% and more preferably at least about 80% by weight of the coke on the catalyst is removed in a combustion zone in which the molar ratio of $CO_2$ to $CO$ is maintained at a level substantially below 5, e.g., about 4 or less. Looking at the $CO_2/CO$ relationship from the inverse standpoint, it is preferred that the $CO/CO_2$ molar ratio should be at least about 0.25 and preferably at least about 0.3 and still more preferably about 1 or more or even 1.5 or more.

U.S. Pat. No. 4,376,696 for "Addition of $MgCl_2$ to Catalyst" and U.S. Pat. No. 4,375,404 for "Addition of Chlorine to Regenerator" both in the name of George D. Myers describe methods for inhibiting the oxidation of $CO$ to $CO_2$, thus increasing the $CO/CO_2$ ratio, and disclosures of each of these patent applications is hereby incorporated by reference. U.S. Pat. No. 4,425,259 in the name of William P. Hettinger, Jr., et al, for "Endothermic Removal of Coke Deposited on Catalytic Material During Carbo-Metallic Oil Conversion" describes catalysts containing additives which catalyze the reaction between $CO_2$ and carbon to form $CO$, thus reducing the heat produced in the regenerator.

While persons skilled in the art are aware of techniques for inhibiting the burning of $CO$ to $CO_2$, it has been suggested that the mole ratio of $CO:CO_2$ should be kept less than 0.2 when regenerating catalyst with large heavy metal accumulations resulting from the processing of carbo-metallic oils. In this connection see for example U.S. Pat. No. 4,162,213 to Zrinscak, Sr., et al. In this invention, however, $CO$ production is increased while catalyst is regenerated to about 0.1% carbon or less, and preferably to about 0.05% carbon or less. Moreover, according to a preferred method of carrying out the invention the sub-process of regeneration, as a whole, may be carried out to the above-mentioned low levels of carbon on regenerated catalyst with a deficiency of oxygen; more specifically, the total oxygen supplied to the one or more stages of regeneration can be and preferably is less than the stoichiometric amount which would be required to burn all hydrogen in the coke to $H_2O$ and to burn all carbon in the coke to $CO_2$. If the coke includes other combustibles, the aforementioned stoichiometric amount can be adjusted to include the amount of oxygen required to burn them.

Still another particularly preferred technique for controlling or restricting the regeneration heat imparted to fresh feed via recycled catalyst involves the diversion of a portion of the heat borne by recycled catalyst to added materials introduced into the reactor, such as the water, steam, naphtha, other hydrogen donors, flue gases, inert gases, and other gaseous or vaporizable materials which may be introduced into the reactor.

The larger the amount of coke which must be burned from a given weight of catalyst, the greater the potential for exposing the catalyst to excessive temperatures.

Many otherwise desirable and useful cracking catalysts are particularly susceptible to deactivation at high temperatures, and among these are quite a few of the costly molecular sieve or zeolite types of catalyst. The crystal structures of zeolites and the pore structures of the catalyst carriers generally are somewhat susceptible to thermal and/or hydrothermal degradation. The use of such catalysts in catalytic conversion processes for carbo-metallic feeds creates a need for regeneration techniques which will not destroy the catalyst by exposure to highly severe temperatures and steaming. Such need can be met by a multi-stage regeneration process which includes conveying spent catalyst into a first regeneration zone and introducing oxidizing gas thereto. The amount of oxidizing gas that enters said first zone and the concentration of oxygen or oxygen bearing gas therein are sufficient for only partially effecting the desired conversion of coke on the catalyst to carbon oxide gases. The partially regenerated catalyst is then removed from the first regeneration zone and is conveyed to a second regeneration zone. Oxidizing gas is introduced into the second regeneration zone to provide a higher concentration of oxygen or oxygen-containing gas than in the first zone, to complete the removal of carbon to the desired level. The regenerated catalyst may then be removed from the second zone and recycled to the reactor for contact with fresh feed. An example of such multi-stage regeneration process is described in U.S. patent application Ser. No. 969,602 of George D. Myers, et al., filed Dec. 14, 1978, the entire disclosure of which is hereby incorporated herein by reference. Another example may be found in U.S. Pat. No. 2,928,739.

Multi-stage regeneration offers the possibility of combining oxygen deficient regeneration with the control of the $CO:CO_2$ molar ratio. Thus, about 50% or more, more preferably about 65% to about 95%, and more preferably about 80% to about 95% by weight of the coke on the catalyst immediately prior to regeneration may be removed in one or more stages of regeneration in which the molar ratio of $CO:CO_2$ is controlled in the manner described above. In combination with the foregoing, the last 5% or more, or 10% or more by weight of the coke originally present, up to the entire amount of coke remaining after the preceding stage or stages, can be removed in a subsequent stage of regeneration in which more oxygen is present. Such process is susceptible of operation in such a manner that the total flue gas recovered from the entire, completed regeneration operation contains little or no excess oxygen, i.e., on the order of about 0.2 mole percent or less, or as low as about 0.1 mole percent or less, which is substantially less than the mole percent which has been suggested elsewhere. Thus, multi-stage regeneration is particularly beneficial in that it provides another convenient technique for restricting regeneration heat transmitted to fresh feed via regenerated catalyst and/or reducing the potential for thermal deactivation, while simultaneously affording an opportunity to reduce the carbon level on regenerated catalyst to those very low percentages (e.g., about 0.1% or less) which particularly enhance catalyst activity. For example, a two-stage regeneration process may be carried out with the first stage burning about 80% of the coke at a bed temperature of about 1300° F. to produce CO and $CO_2$ in a molar ratio of $CO/CO_2$ of about 1 and the second stage burning about 20% of the coke at a bed temperature of about 1350° F. to produce substantially all $CO_2$ mixed with free oxygen. Use of the gases from the second stage as combustion supporting gases for the first stage, along with additional air introduced into the first stage bed, results in an overall CO to $CO_2$ ratio of about 0.6, with a catalyst residence time of about 5 to 15 minutes total in the two zones. Moreover, where the regeneration conditions, e.g., temperature or atmosphere, are substantially less severe in the second zone than in the first zone (e.g., by at least about 10 and preferably at least about 20° F.), that part of the regeneration sequence which involves the most severe conditions is performed while there is still an appreciable amount of coke on the catalyst. Such operation may provide some protection of the catalyst from the more severe conditions. A particularly preferred embodiment of the invention is two-stage fluidized regeneration at a maximum temperature of about 1400° F. with a reduced temperature of at least about 10° or 20° F. in the dense phase of the second stage as compared to the dense phase of the first stage, and with reduction of carbon on catalyst to about 0.05% or less or even about 0.025% or less by weight in the second zone. In fact, catalyst can readily be regenerated to carbon levels as low as 0.01% by this technique, even though the carbon on catalyst prior to regeneration is as much as about 1%.

STRIPPING REGENERATED CATALYST

In most circumstances, it will be important to insure that no adsorbed oxygen containing gases are carried into the riser by recycled catalyst. Thus, whenever such action is considered necessary, the catalyst discharged from the regenerator may be stripped with appropriate stripping gases to remove oxygen-containing gases. Such stripping may for instance be conducted at relatively high temperatures, for example about 1350° to about 1370° F., using steam, nitrogen or other inert gas as the stripping gas(es). The use of nitrogen and other inert gases is beneficial from the standpoint of avoiding a tendency toward hydrothermal catalyst deactivation which may result from the use of steam.

PROCESS MANAGEMENT

The following comments and discussion relating to metals management, carbon management and heat management may be of assistance in obtaining best results when operating the invention. Since these remarks are for the most part directed to what is considered the best mode of operation, it should be apparent that the invention is not limited to the particular modes of operation discussed below. Moreover, since certain of these comments are necessarily based on theoretical considerations, there is no intention to be bound by any such theory, whether expressed herein or implicit in the operating suggestions set forth hereinafter.

Although discussed separately below, it is readily apparent that metals management, carbon management and heat management are interrelated and interdependent subjects both in theory and practice. While coke yield and coke laydown on catalyst are primarily the result of the relatively large quantities of coke precursors found in carbo-metallic oils, the production of coke is exacerbated by high metals accumulations, which can also significantly affect catalyst performance. Moreover, the degree of success experienced in metal management and carbon management will have a direct influence on the extent to which heat management is necessary. Moreover, some of the steps taken in support of metals management have proved very helpful in respect to carbon and heat management.

As noted previously the presence of a large heavy metals accumulation on the catalyst tends to aggravate the problem of dehydrogenation and aromatic condensation, resulting in increased production of gases and coke for a feedstock of a given Ramsbottom carbon value. The introduction of substantial quantities of $H_2O$ into the reactor, either in the form of steam or liquid water, appears highly beneficial from the standpoint of keeping the heavy metals in a less harmful form, i.e., the oxide rather than metallic form. This is of assistance in maintaining the desired selectivity.

Also, a unit design in which system components and residence times are selected to reduce the ratio of catalyst reactor residence time relative to catalyst regenerator residence time will tend to reduce the ratio of the times during which the catalyst is respectively under reduction conditions and oxidation conditions. This too can assist in maintaining desired levels of selectivity.

Whether the metals content of the catalyst is being managed successfully may be observed by monitoring the total hydrogen plus methane produced in the reactor and/or the ratio of hydrogen to methane thus produced. In general, it is considered that the hydrogen to methane mole ratio should be less than about 1 and preferably about 0.6 or less, with about 0.4 or less being considered about optimum. In actual practice the hydrogen to methane ratio may range from about 0.5 to about 1.5 and average about 0.8 to about 1.

Careful carbon management can improve both selectivity (the ability to maximize production of valuable products), and heat productivity. In general, the techniques of metals control described above are also of assistance in carbon management. The usefulness of water addition in respect to carbon management has already been spelled out in considerable detail in that part of the specification which relates to added materials for introduction into the reaction zone. In general, those techniques which improve dispersion of the feed in the reaction zone should also prove helpful. These include for instance the use of fogging or misting devices to assist in dispersing the feed.

Catalyst-to-oil ratio is also a factor in heat management. In common with prior FCC practice on VGO, the reactor temperature may be controlled in the practice of the present invention by respectively increasing or decreasing the flow of hot regenerated catalyst to the reactor in response to decreases and increases in reactor temperature, typically the outlet temperature in the case of a riser type reactor. Where the automatic controller for catalyst introduction is set to maintain an excessive catalyst to oil ratio, one can expect unnecessarily large rates of carbon production and heat release, relative to the weight of fresh feed charged to the reaction zone.

Relatively high reactor temperatures are also beneficial from the standpoint of carbon management. Such higher temperatures foster more complete vaporization of feed and disengagement of product from catalyst.

Carbon management can also be facilitated by suitable restriction of the total pressure in the reactor and the partial pressure of the feed. In general, at a given level of conversion, relatively small decreases in the aforementioned pressures can substantially reduce coke production. This may be due to the fact that restricting total pressure tends to enhance vaporization of high boiling components of the feed, encourage cracking and facilitate disengagement of both unconverted feed and higher boiling cracked products from the catalyst. It may be of assistance in this regard to restrict the pressure drop of equipment downstream of and in communication with the reactor. But if it is desired or necessary to operate the system at higher total pressure, such as for instance because of operating limitations (e.g., pressure drop in downstream equipment) the above-described benefits may be obtained by restricting the feed partial pressure. Suitable ranges for total reactor pressure and feed partial pressure have been set forth above, and in general it is desirable to attempt to minimize the pressure within these ranges.

The abrupt separation of catalyst from product vapors and unconverted feed (if any) is also of great assistance. For this reason ballistic separation equipment is the preferred type of apparatus for conducting this process. For similar reasons, it is beneficial to reduce insofar as possible the elapsed time between separation of catalyst from product vapors and the commencement of stripping. The cup-type vented riser and prompt stripping tend to reduce the opportunity for coking of unconverted feed and higher boiling cracked products adsorbed on the catalyst.

A particularly desirable mode of operation from the standpoint of carbon management is to operate the process in the vented riser using a hydrogen donor if necessary, while maintaining the feed partial pressure and total reactor pressure as low as possible, and incorporating relatively large amounts of water, steam and if desired, other diluents, which provide the numerous benefits discussed in greater detail above. Moreover, when liquid water, steam, hydrogen donors, hydrogen and other gaseous or vaporizable materials are fed to the reaction zone, the feeding of these materials provides an opportunity for exercising additional control over catalyst-to-oil ratio. Thus, for example, the practice of increasing or decreasing the catalyst-to-oil ratio for a given amount of decrease or increase in reactor temperature may be reduced or eliminated by substituting either appropriate reduction or increase in the charging ratios of the water, steam and other gaseous or vaporizable material, or an appropriate reduction or increase in the ratio of water to steam and/or other gaseous materials introduced into the reaction zone.

Heat management includes measures taken to control the amount of heat released in various parts of the process and/or for dealing successfully with such heat as may be released. Unlike conventional FCC practice using VGO, wherein it is usually a problem to generate sufficient heat during regeneration to heat balance the reactor, the processing of carbo-metallic oils generally produces so much heat as to require careful management thereof.

Heat management can be facilitated by various techniques associated with the materials introduced into the reactor. Thus, heat absorption by feed can be maximized by minimum preheating of feed, it being necessary only that the feed temperature be high enough so that it is sufficiently fluid for successful pumping and dispersion in the reactor. When the catalyst is maintained in a highly active state with the suppression of coking (metals control), so as to achieve higher conversion, the resultant higher conversion and greater selectivity can increase the heat absorption of the reaction. In general, higher reactor temperatures promote catalyst conversion activity in the face of more refractory and higher boiling constituents with high coking potentials. While the rate of catalyst deactivation may thus be increased, the higher temperature of operation tends to offset this loss in activity. Higher temperatures in the reactor also contribute to enhancement of octane number, thus offsetting the octane depressant effect of high carbon laydown. Other techniques for absorbing heat have also been discussed above in connection with the introduction of water, steam, and other gaseous or vaporizable materials into the reactor.

The invention may also be applied to the RCC conversion of crude oils and crude oil fractions as disclosed in the U.S. Pat. No. 4,384,948 of Dwight F. Barger, entitled "Single Unit RCC," the entire contents of which are hereby incorporated by reference.

What is claimed is:

1. A method for regenerating coke-bearing spent catalyst particles which comprises,
   (a) providing a regeneration zone comprising at least an upper catalyst regeneration section separate from a lower bottom regenerated catalyst collection section,
   (b) said upper catalyst regeneration section comprising a relatively dense fluid mass of catalyst particles therein being regenerated by combustion of coke with oxygen containing gas charged beneath said bed and passed upwardly therethrough,
   (c) passing gaseous products of combustion and particles of catalyst removed from an upper portion of said relatively dense fluid mass of catalyst particles downwardly as a confined stream through an open ended elongated confined transfer zone, the bottom end thereof being displaced above a collected mass of regenerated catalyst particles collected in a bottom portion of said collection section,
   (d) withdrawing gaseous products of combustion separated from catalyst particles into an annular zone about the lower bottom open end periphery of said transfer zone,
   (e) withdrawing gaseous products from said annular zone by an elongated confined zone communicating with the exterior of said collection section,
   (f) replacing regenerated catalyst particles withdrawn from said upper section with coke bearing catalyst particles, and
   (g) withdrawing regenerated catalyst particles from collected catalyst in said collection section.

2. The method of claim 1 wherein a separate second dense fluid bed of catalyst particles is positioned intermediate said upper catalyst regeneration section and said catalyst collection section,
   (a) regeneration gas is introduced to a bottom portion of said intermediate bed of catalyst for flow upwardly therethrough,
   (b) spent catalyst is introduced to said intermediate bed of catalyst,
   (c) partially regenerated catalyst and combustion product gas are passed from an upper portion of said intermediate catalyst bed to said fluid mass of catalyst particles in said upper catalyst regeneration section for further contact therein with oxygen containing gas before passage to said catalyst collection section for separation therein from combustion product flue gases.

3. The method of claim 1 wherein coke containing spent catalyst is obtained by the catalytic conversion of a hydrocarbon feed boiling above about 650° F. and characterized by a carbon residue on pyrolysis of at least about 2 and comprising metal contaminants in an amount of at least 4 ppm of nickel equivalents whereby at least 6 weight percent of coke based on feed is laid down on the catalyst particles.

4. The method of claim 3 wherein conversion of the hydrocarbon feed is accomplished in a riser conversion zone for a hydrocarbon vapor residence time within the range of 0.5 to 3 seconds to provide a conversion per pass of at least 60%.

5. The method of claim 1 wherein the regenerated catalyst comprises 0.1 percent or less by weight of coke.

6. The method of claim 1 wherein the velocity of the catalyst particles discharged from the bottom open end of the confined transfer zone are of a higher momentum than the gaseous combustion products discharged therewith thereby promoting separation thereof.

7. The method of claim 1 or 2 wherein the catalyst is regenerated at a temperature within the range of about 1100° F. up to about 1600° F.

8. The method of claim 1 or 2 wherein the catalyst is regenerated at a temperature within the range of 1200° to 1500° F.

9. A method for regenerating spent catalyst particles comprising carbonaceous deposits of converting hydrocarbons boiling above about 650° F. which comprises,
   (a) passing catalyst particles to be regenerated to a dense fluid bed of catalyst particles being regenerated by passing oxygen containing combustion supporting gases upwardly through said dense fluid catalyst bed,
   (b) passing regenerated catalyst withdrawn from an upper level of said dense fluid bed with combustion product flue gases downwardly through an open ended elongated confined zone discharging from the bottom open end thereof into a flue gas-catalyst particle separation and collection zone and above a bed of collected regenerated catalyst particles therein,
   (c) withdrawing combustion product flue gases separated in said collection zone by a downward momentum differential from catalyst particles into an annular bottom open end zone about the bottom open end periphery of the elongated confined zone,
   (d) withdrawing combustion product flue gases from said catalyst collection zone by said annular zone in open communication with a withdrawal confined passageway communicating with a cyclone separation zone and the exterior of said separation zone, and
   (e) separately withdrawing regenerated catalyst from said bed of collected regenerated catalyst particles for use in hydrocarbon conversion.

10. A method for regenerating catalyst particles with combustion supporting oxygen containing gas to remove carbonaceous deposits of hydrocarbon conversion which comprises,
    (a) contacting spent catalyst particles obtained from a hydrocarbon conversion operation in a first dense fluid catalyst bed zone with oxygen containing combustion supporting gas to produce a first flue gas stream and partially regenerated catalyst particles,
    (b) passing catalyst particles and said first flue gas stream from an upper portion of said first dense fluid catalyst bed into a second separate zone of catalyst regeneration for discharge into a second dense fluid catalyst bed in said separate regeneration zone,
    (c) passing oxygen containing combustion supporting gases upwardly through said second dense fluid catalyst bed under conditions to combust coke therein, (d) passing regenerated catalyst particles and combustion flue gas products from an upper portion of said second dense fluid catalyst bed downwardly as a confined stream into a separate fluid gas-catalyst particle separation and collection zone beneath said first and second dense fluid catalyst beds, (e) the downward thrust momentum of said confined stream of flue gas and catalyst particles being of a velocity to impart a greater momentum to said catalyst particle than said flue gases whereby separation thereof rapidly occurs upon discharge from the bottom open end of said confined stream into said flue gas-catalyst particle separation zone, collecting catalyst particles separated from flue gas in a bottom portion of said separation zone for withdrawal therefrom, (f) passing momentum separated flue gas through a cyclone separation zone in said separation zone and passing cyclone separated catalyst particles into said collected catalyst particles, and (g) recovering separated flue gas from said cyclone separation zone.

* * * * *